(12) United States Patent
Lu et al.

(10) Patent No.: US 9,661,567 B2
(45) Date of Patent: May 23, 2017

(54) METHOD, APPARATUS AND SYSTEM FOR SERVICE ESTABLISHMENT FOR MULTI-MODE USER EQUIPMENT

(71) Applicant: Huawei Technologies Co., Ltd., Shenzhen (CN)

(72) Inventors: Yao Lu, Shenzhen (CN); Kun Zeng, Shenzhen (CN); You Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/732,059

(22) Filed: Jun. 5, 2015

(65) Prior Publication Data

US 2015/0271749 A1    Sep. 24, 2015

Related U.S. Application Data

(63) Continuation of application No. PCT/CN2013/083703, filed on Sep. 18, 2013.

(30) Foreign Application Priority Data

Dec. 7, 2012    (CN) .......................... 2012 1 0523867

(51) Int. Cl.
*H04W 48/20* (2009.01)
*H04W 76/02* (2009.01)
(Continued)

(52) U.S. Cl.
CPC ....... *H04W 48/20* (2013.01); *H04W 36/0027* (2013.01); *H04W 48/18* (2013.01);
(Continued)

(58) Field of Classification Search
CPC ..... H04W 48/18; H04W 88/06; H04W 88/10; H04W 36/14
See application file for complete search history.

(56) References Cited

U.S. PATENT DOCUMENTS

2007/0291699 A1    12/2007    Lee et al.
2010/0048205 A1    2/2010    Guilford et al.
(Continued)

FOREIGN PATENT DOCUMENTS

CN    101146319 A    3/2008
CN    101198150 A    6/2008
(Continued)

OTHER PUBLICATIONS

"Switching Technology B3G Wireless Heterogeneous Networks," China Academic Journal Electronic Publishing House, 2007, 9 pages, available at http://www.cniki.net.

*Primary Examiner* — Nam Huynh
(74) *Attorney, Agent, or Firm* — Brinks Gilson & Lione

(57) ABSTRACT

The embodiments of the present invention provide a method, an apparatus and a system for service establishment for a multi-mode user equipment. In an embodiments of the present invention, a centralized control entity (Controller) may obtain the base station information of the respective base stations in the multi-RAT network in real time and select proper RAT base station information in accordance with service demand of the user equipment, so as to initiate bearer establishment for the service. Compared with the prior art which only aims at a particular service and handover can only be performed in particular RAT networks, the present solution does not has particular limitation on a service, and moreover, a proper RAT network may be selected from multiple RAT networks more flexibly for each service without increasing power consumption of the user equipment.

12 Claims, 6 Drawing Sheets

(51) Int. Cl.
*H04W 36/00* (2009.01)
*H04W 48/18* (2009.01)
H04W 88/06 (2009.01)
H04W 88/10 (2009.01)
H04W 88/12 (2009.01)

(52) U.S. Cl.
CPC ...... *H04W 76/021* (2013.01); *H04W 36/0061* (2013.01); *H04W 88/06* (2013.01); *H04W 88/10* (2013.01); *H04W 88/12* (2013.01)

(56) References Cited

U.S. PATENT DOCUMENTS

| | | |
|---|---|---|
| 2010/0178919 A1 | 7/2010 | Deepak et al. |
| 2010/0234042 A1 | 9/2010 | Chan et al. |
| 2010/0323690 A1 | 12/2010 | Shaw |
| 2011/0151924 A1 | 6/2011 | Miller |
| 2012/0026974 A1 | 2/2012 | Fong |
| 2012/0094711 A1 | 4/2012 | Lee et al. |

FOREIGN PATENT DOCUMENTS

| | | |
|---|---|---|
| CN | 102395210 A | 3/2012 |
| CN | 102761928 A | 10/2012 |
| EP | 2 079 254 A1 | 7/2009 |
| EP | 2 237 505 A1 | 10/2010 |
| WO | WO 2011/107886 A1 | 9/2011 |

METHOD, APPARATUS AND SYSTEM FOR SERVICE ESTABLISHMENT FOR MULTI-MODE USER EQUIPMENT

CROSS-REFERENCE TO RELATED APPLICATIONS

This application is a continuation of International Application No. PCT/CN2013/083703, filed on Sep. 18, 2013, which claims priority to Chinese Patent Application No. 201210523867.6, filed on Dec. 7, 2012, both of which are hereby incorporated by reference in their entireties.

TECHNICAL FIELD

The present invention relates to the field of communications, and more particularly, to a method, an apparatus and a system for service establishment for a multi-mode user equipment.

BACKGROUND

At present, a radio network includes multiple radio access technologies (multi-RAT), such as, for example, a global system for mobile communication (GMS), a universal mobile telecommunications system (UMTS), long term evolution (LTE) and wireless fidelity (WIFI), etc. Since different services may need different RAT base stations to bear, when a multi-mode user equipment (UE) initiates a service, which RAT base station bears the service is an important problem.

Normally, there does not exist direct interface between different RAT base stations, so they could not directly interact resources, load and other information. Therefore, a centralized control entity (Controller) is introduced in the prior art to control the multiple RAT base stations, and an interface is present between the centralized control entity and each of the RAT base stations. The centralized control entity may receive information reported by each of the RAT base stations, such as load condition, position information of a user equipment and/or the like, and control the each of the RAT base station hereby. In a current LTE network, a single-card dual-standby solution is generally adopted for voice service and data service under multi-RAT. In the solution, when a user equipment is idle, the user equipment simultaneously resides in LTE and a second generation mobile network communication technology/third generation mobile network communication technology (2G/3G, 2nd Generation/3rd Generation) network, wherein the voice service is initiated via the 2G/3G network, and the data service is initiated via the LTE network. Since the user equipment needs to simultaneously reside in two networks, power consumption is increased. Therefore, a circuit switched fall back (CSFB) solution is further proposed in the prior art. In the solution, a user equipment resides in the LTE network when being idle, and when a user initiates a call or receives a call, the user equipment switches to the 2G/3G network and switches back to the LTE network after the call is terminated.

In a research and practice process of the prior art, the inventor of the present invention has found that, although the circuit switched fall back solution may reduce power consumption of a user equipment, the solution can only aim at voice service, and in the presence of voice service, the user equipment must switches to the 2G/3G network, while the 2G/3G network is not necessarily suitable for bearing the service at the moment, so a data transmission error may occur; and moreover, the solution can only falls from LTE back to the 2G/3G network, therefore, the solution has limitation and is not flexible enough.

SUMMARY

Embodiments of the present invention provide a method, an apparatus and a system for service establishment for a multi-mode user equipment, which may select a proper RAT network more flexibly from multiple RAT networks so as to establish a service, and meanwhile, power consumption of a user equipment is not increased.

A method for service establishment for a multi-mode user equipment, includes:

receiving a service request sent by a first multi-mode user equipment, wherein the service request carries an identity (ID) of the first multi-mode user equipment, a service type and information about quality of service (QoS) required by a service;

obtaining base station information of respective base stations in a multi-radio access technology network, wherein the base station information includes information on load of a base station and information on quality of service of a service that the base station can provide;

determining target base station information according to the service request and the base station information; and initiating bearer establishment for the service according to the target base station information, or sending the target base station information to the first multi-mode user equipment, such that the first multi-mode user equipment initiates bearer establishment for the service according to the target base station information.

Optionally, the obtaining base station information of respective base stations in a multi-radio access technology network includes:

obtaining capability information, subscription data and position information of the first multi-mode user equipment according to the identity of the first multi-mode user equipment; obtaining network coverage information of the respective base stations in the multi-radio access technology network; determining, according to the capability information, the subscription data and the position information of the first multi-mode user equipment and the network coverage information, a base station set where the first multi-mode user equipment can reside; and obtaining base station information of respective respective base stations in the base station set where the first multi-mode user equipment can reside.

The determining target base station information according to the service request and the base station information may include:

selecting, according to the service request and the base station information of the respective base stations in the base station set where the first multi-mode user equipment can reside, a target base station from the base station set where the first multi-mode user equipment can reside; and in this case, the initiating bearer establishment for the service according to the target base station information is specifically initiating bearer establishment for the service towards the target base station.

Or, the determining target base station information according to the service request and the base station information may include:

selecting, according to the service request and the base station information of the respective base stations in the base station set where the first multi-mode user equipment can reside, a plurality of target base stations from the base station set where the first multi-mode user equipment can reside, so as to obtain a target base station list; and in this case, the sending the target base station information to the first multi-mode user equipment, such that the first multi-mode user equipment initiates bearer establishment for the service according to the first target base station information, is specifically: sending the target base station list to the first multi-mode user equipment, such that the first multi-mode user equipment determines a target base station according to the target base station list and initiates bearer establishment for the service towards the target base station.

Optionally, the service request further carries a base station set where the first multi-mode user equipment has resided, and in this case, the method may further include:

obtaining base station information of respective base stations in the base station set where the first multi-mode user equipment has resided; selecting, according to the service request and the base station information of the respective base stations in the base station set where the first multi-mode user equipment has resided, a target base station from the base station set where the first multi-mode user equipment has resided; if a target base station can be selected from the base station set where the first multi-mode user equipment has resided, initiating bearer establishment for the service towards the target base station; and if a target base station cannot be selected from the base station set where the first multi-mode user equipment has resided, performing the step of obtaining base station information of respective base stations in a multi-radio access technology network.

The determining target base station information according to the service request and the base station information may include:

selecting, according to the service request and the base station information of the respective base stations in the base station set where the first multi-mode user equipment can reside, a target base station from a difference set of the base station set where the first multi-mode user equipment can reside and the base station set where the first multi-mode user equipment has resided; and in this case, the initiating bearer establishment for the service according to the target base station information is specifically: initiating bearer establishment for the service towards the target base station.

Or, the determining target base station information according to the service request and the base station information may include:

selecting, according to the service request and the base station information of the respective base stations in the base station set where the first multi-mode user equipment can reside, a plurality of target base stations from a difference set of the base station set where the first multi-mode user equipment can reside and the base station set where the first multi-mode user equipment has resided, so as to obtain a target base station list; and in this case, the sending the target base station information to the first multi-mode user equipment, such that the first multi-mode user equipment initiates bearer establishment for the service according to the first target base station information, is specifically: sending the target base station list to the first multi-mode user equipment, such that the first multi-mode user equipment determines a target base station according to the target base station list and initiates bearer establishment for the service towards the target base station.

Optionally, the service request further carries a base station set where the first multi-mode user equipment has resided and an identity of a second multi-mode user equipment, and after receiving the service request sent by the first multi-mode user equipment, the method may further include:

paging the second multi-mode user equipment via the respective base stations in the multi-radio access technology network; sending a residence information inquiry request to the second multi-mode user equipment, so as to obtain a base station set where the second multi-mode user equipment has resided; obtaining base station information of respective base stations in the base station set where the first multi-mode user equipment has resided and base station information of respective base stations in the base station set where the second multi-mode user equipment has resided; selecting, according to the service request and the base station information of the respective base stations in the base station set where the first multi-mode user equipment has resided, a first target base station from the base station set where the first multi-mode user equipment has resided; selecting, according to the service request and the base station information of the respective base stations in the base station set where the second multi-mode user equipment has resided, a second target base station from the base station set where the second multi-mode user equipment has resided; if a first target base station can be selected from the base station set where the first multi-mode user equipment has resided and a second target base station can be selected from the base station set where the second multi-mode user equipment has resided, initiating bearer establishment for the service towards the first target base station and the second target base station respectively; and if a first target base station cannot be selected from the base station set where the first multi-mode user equipment has resided or a second target base station cannot be selected from the base station set where the second multi-mode user equipment has resided, performing the step of obtaining base station information of the respective base stations in a multi-radio access technology network.

The obtaining base station information of respective base stations in a multi-radio access technology network may include:

obtaining, according to the identity of the first multi-mode user equipment and the identity of the second multi-mode user equipment, capability information, subscription data and position information of the first multi-mode user equipment, and capability information, subscription data and position information of the second multi-mode user equipment, respectively; obtaining network coverage information of the respective base stations in the multi-radio access technology network; determining, according to the capability information, the subscription data and the position information of the first multi-mode user equipment and the network coverage information, a base station set where the first multi-mode user equipment can reside; determining, according to the capability information, the subscription data and the position information of the second multi-mode user equipment and the network coverage information, a base station set where the second multi-mode user equipment can reside; and obtaining base station information of respective base stations in the base station set where the first multi-mode user equipment can reside, and obtaining base station information of respective base stations in the base station set where the second multi-mode user equipment can reside.

The determining target base station information according to the service request and the base station information may include: selecting, according to the service request and the base station information of the respective base stations in the base station set where the first multi-mode user equipment can reside, a first target base station from a difference set of the base station set where the first multi-mode user equipment can reside and the base station set where the first multi-mode user equipment has resided; and selecting, according to the service request and the base station information of the respective base stations in the base station set where the second multi-mode user equipment can reside, a second target base station from a difference set of the base station set where the second multi-mode user equipment can reside and the base station set where the second multi-mode user equipment has resided; and in this case, the initiating bearer establishment for the service according to the target base station information may be specifically: initiating bearer establishment for the service towards the first target base station and the second target base station respectively.

Optionally, the determining target base station information according to the service request and the base station information may also include: selecting, according to the service request and the base station information of the respective base stations in the base station set where the first multi-mode user equipment can reside, a plurality of first target base stations from a difference set of the base station set where the first multi-mode user equipment can reside and the base station set where the first multi-mode user equipment has resided, so as to obtain a first target base station list; and selecting, according to the service request and the base station information of the respective base stations in the base station set where the second multi-mode user equipment can reside, a plurality of second target base stations from a difference set of the base station set where the second multi-mode user equipment can reside and the base station set where the second multi-mode user equipment has resided, so as to obtain a second target base station list; and in this case, the sending the target base station information to the first multi-mode user equipment, such that the first multi-mode user equipment initiates bearer establishment for the service according to the target base station information, may be specifically: sending the first target base station list to the first multi-mode user equipment, such that the first multi-mode user equipment determines a first target base station according to the first target base station list and initiates bearer establishment for the service towards the first target base station;

and moreover, the method may further include: sending the second target base station list to the second multi-mode user equipment, such that the second multi-mode user equipment determines a second target base station according to the second target base station list and initiates bearer establishment for the service towards the second target base station.

Correspondingly, an embodiment of the present invention further provides another method for service establishment for a multi-mode user equipment, including:

sending a service request to a centralized control entity, wherein the service request carries an identity of a first multi-mode user equipment, a service type and information about QoS required by a service;

receiving target base station information sent by the centralized control entity according to the service request; and initiating bearer establishment for the service according to the target base station information.

Optionally, the receiving target base station information sent by the centralized control entity according to the service request may include:

receiving a target base station list sent by the centralized control entity according to the service request; and in this case, the initiating bearer establishment for the service according to the target base station information may be specifically: selecting a target base station from the target base station list, and initiating bearer establishment for the service according to the target base station.

The initiating bearer establishment for the service according to the target base station may include: determining whether itself has attached to a network to which the target base station belongs; if itself has attached to the network, handing over to the target base station, and initiating bearer establishment for the service towards the target base station; and if itself has not attached to the network, initiating establishment of a service bearer towards the target base station after being attached to the network to which the target base station belongs.

Correspondingly, an embodiment of the present invention further provides a network side device, including a receiving unit, an obtaining unit, a determining unit and a processing unit; wherein the receiving unit is configured to receive a service request sent by a first multi-mode user equipment, wherein the service request carries an identity of the first multi-mode user equipment, a service type and information about quality of service required by a service;

the obtaining unit is configured to obtain base station information of respective base stations in a multi-radio access technology network, wherein the base station information includes information on load of a base station and information on quality of service of a service that the base station can provide;

the determining unit is configured to determine target base station information according to the service request and the base station information; and the processing unit is configured to initiate bearer establishment for the service according to the target base station information, or send the target base station information to the first multi-mode user equipment, such that the first multi-mode user equipment initiates bearer establishment for the service according to the target base station information.

Optionally, the obtaining unit may be specifically configured to obtain capability information, subscription data and position information of the first multi-mode user equipment according to the identity of the first multi-mode user equipment; obtain network coverage information of the respective base stations in the multi-radio access technology network; determine, according to the capability information, the subscription data and the position information of the first multi-mode user equipment and the network coverage information, a base station set where the first multi-mode user equipment can reside; and obtain base station information of respective respective base stations in the base station set where the first multi-mode user equipment can reside.

The determining unit may be specifically configured to select, according to the service request and the base station information of the respective base stations in the base station set where the first multi-mode user equipment can reside, a target base station from the base station set where the first multi-mode user equipment can reside; and in this case, the processing unit may be specifically configured to initiate bearer establishment for the service towards the target base station.

Optionally, the determining unit may also be specifically configured to select, according to the service request and the base station information of the respective base stations in the base station set where the first multi-mode user equipment can reside, a plurality of target base stations from the base station set where the first multi-mode user equipment can reside, so as to obtain a target base station list; and in this case, the processing unit may be specifically configured to send the target base station list to the first multi-mode user equipment, such that the first multi-mode user equipment determines a target base station according to the target base station list and initiates bearer establishment for the service towards the target base station.

Optionally, the service request may further carry a base station set where the first multi-mode user equipment has resided, and the obtaining unit may be further configured to obtain base station information of respective base stations in the base station set where the first multi-mode user equipment has resided;

the determining unit may be further configured to select, according to the service request and the base station information of the respective base stations in the base station set where the first multi-mode user equipment has resided, a target base station from the base station set where the first multi-mode user equipment has resided; and the processing unit may be further configured to, if a target base station can be selected from the base station set where the first multi-mode user equipment has resided, initiate bearer establishment for the service towards the target base station; and if a target base station cannot be selected from the base station set where the first multi-mode user equipment has resided, trigger the obtaining unit to perform the step of obtaining base station information of respective base stations in a multi-radio access technology network.

Optionally, the determining unit may be specifically configured to select, according to the service request and the base station information of the respective base stations in the base station set where the first multi-mode user equipment can reside, a target base station from a difference set of the base station set where the first multi-mode user equipment can reside and the base station set where the first multi-mode user equipment has resided; and in this case, the processing unit may be specifically configured to initiate bearer establishment for the service towards the target base station.

Or, optionally, the determining unit may be specifically configured to select, according to the service request and the base station information of the respective base stations in the base station set where the first multi-mode user equipment can reside, a plurality of target base stations from a difference set of the base station set where the first multi-mode user equipment can reside and the base station set where the first multi-mode user equipment has resided, so as to obtain a target base station list; and in this case, the processing unit may be specifically configured to send the target base station list to the first multi-mode user equipment, such that the first multi-mode user equipment determines a target base station according to the target base station list and initiates bearer establishment for the service towards the target base station.

Optionally, the service request may further carry a base station set where the first multi-mode user equipment has resided and an identity of a second multi-mode user equipment, the network side device further includes a paging unit and an inquiry unit;

the paging unit is configured to page the second multi-mode user equipment via the respective base stations in the multi-radio access technology network;

the inquiry unit is configured to a residence information inquiry request to the second multi-mode user equipment, so as to obtain a base station set where the second multi-mode user equipment has resided;

obtaining unit may be further configured to obtain base station information of respective base stations in the base station set where the first multi-mode user equipment has resided and base station information of respective base stations in the base station set where the second multi-mode user equipment has resided;

the determining unit may be further configured to select, according to the service request and the base station information of the respective base stations in the base station set where the first multi-mode user equipment has resided, a first target base station from the base station set where the first multi-mode user equipment has resided, and select, according to the service request and the base station information of the respective base stations in the base station set where the second multi-mode user equipment has resided, a second target base station from the base station set where the second multi-mode user equipment has resided; and the processing unit may be further configured to, if a first target base station can be selected from the base station set where the first multi-mode user equipment has resided and a second target base station can be selected from the base station set where the second multi-mode user equipment has resided, initiate bearer establishment for the service towards the first target base station and the second target base station respectively; and if a first target base station cannot be selected from the base station set where the first multi-mode user equipment has resided or a second target base station cannot be selected from the base station set where the second multi-mode user equipment has resided, trigger the obtaining unit to perform the step of obtaining base station information of the respective base stations in a multi-radio access technology network.

Further, the obtaining unit may be specifically configured to obtain, according to the identity of the first multi-mode user equipment and the identity of the second multi-mode user equipment, capability information, subscription data and position information of the first multi-mode user equipment, and capability information, subscription data and position information of the second multi-mode user equipment, respectively; obtain network coverage information of the respective base stations in the multi-radio access technology network; determine, according to the capability information, the subscription data and the position information of the first multi-mode user equipment and the network coverage information, a base station set where the first multi-mode user equipment can reside; determine, according to the capability information, the subscription data and the position information of the second multi-mode user equipment and the network coverage information, a base station set where the second multi-mode user equipment can reside; and obtain base station information of respective base stations in the base station set where the first multi-mode user equipment can reside, and obtain base station information of respective base stations in the base station set where the second multi-mode user equipment can reside.

Optionally, the determining unit is specifically configured to select, according to the service request and the base station information of the respective base stations in the base station set where the first multi-mode user equipment can reside, a first target base station from a difference set of the base station set where the first multi-mode user equipment can reside and the base station set where the first multi-mode user equipment has resided; and select, according to the service request and the base station information of the respective base stations in the base station set where the second multi-mode user equipment can reside, a second target base station from a difference set of the base station set where the second multi-mode user equipment can reside and the base station set where the second multi-mode user equipment has resided; and in this case, the processing unit is specifically configured to initiate bearer establishment for the service towards the first target base station and the second target base station respectively.

Or, the determining unit may be specifically configured to select, according to the service request and the base station information of the respective base stations in the base station set where the first multi-mode user equipment can reside, a plurality of first target base stations from a difference set of the base station set where the first multi-mode user equipment can reside and the base station set where the first multi-mode user equipment has resided, so as to obtain a first target base station list; and select, according to the service request and the base station information of the respective base stations in the base station set where the second multi-mode user equipment can reside, a plurality of second target base stations from a difference set of the base station set where the second multi-mode user equipment can reside and the base station set where the second multi-mode user equipment has resided, so as to obtain a second target base station list; and in this case, the processing unit may be specifically configured to send the first target base station list to the first multi-mode user equipment, such that the first multi-mode user equipment determines a first target base station according to the first target base station list and initiates bearer establishment for the service towards the first target base station; and send the second target base station list to the second multi-mode user equipment, such that the second multi-mode user equipment determines a second target base station according to the second target base station list and initiates bearer establishment for the service towards the second target base station.

Correspondingly, an embodiment of the present invention further provides a user equipment, including: a sending unit, a receiving unit and a processing unit, wherein the sending unit of the user equipment is configured to send a service request to a centralized control entity, wherein the service request carries an identity of a first multi-mode user equipment, a service type and information about QoS required by a service;

the receiving unit of the user equipment is configured to receive target base station information sent by the centralized control entity according to the service request; and the processing unit of the user equipment is configured to initiate bearer establishment for the service according to the target base station information.

Optionally, the receiving unit of the user equipment may be specifically configured to receive a target base station list sent by the centralized control entity according to the service request; and in this case, the processing unit of the user equipment is specifically configured to select a target base station from the target base station list, and initiate bearer establishment for the service according to the target base station.

Optionally, the processing unit of the user equipment may be specifically configured to determine whether the user equipment has attached to a network to which the target base station belongs; if the user equipment has attached to the network, hand over to the target base station, and initiate bearer establishment for the service towards the target base station; and if the user equipment has not attached to the network, initiate bearer establishment for the service towards the target base station after being attached to the network to which the target base station belongs.

Correspondingly, an embodiment of the present invention further provides a communication system, including any network side device and any user equipment provided by the embodiments of the present invention.

In the embodiments of the present invention, the service request, which is sent by the first multi-mode user equipment and carries the identity of the first multi-mode user equipment, the service type and the information about QoS required by the service, is received, the base station information of the respective base stations in the multi-RAT network is obtained, the target base station information is determined according to the service request and the base station information, and bearer establishment for the service is initiated according to the target base station information, or the target base station information is sent to the first multi-mode user equipment, such that the first multi-mode user equipment initiates bearer establishment for the service according to the target base station information. Since the centralized control entity in the solution may obtain the base station information of the respective base stations in the multi-RAT network in real time and select proper RAT base station information in accordance with service demand of the user equipment, so as to initiate bearer establishment for the service. Compared with the prior art which only aims at a particular service and handover can only be performed in particular RAT networks, the present solution does not has particular limitation on a service, and moreover, a proper RAT network may be selected from multiple RAT networks more flexibly for each service without increasing power consumption of the user equipment, thus having wider adaptability.

BRIEF DESCRIPTION OF DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings may be obtained by those of ordinary skill in the art without any creative effort.

DETAILED DESCRIPTION OF EMBODIMENTS

A clear and complete description of technical solutions in the embodiments of the present invention will be given below, in combination with the accompanying drawings in the embodiments of the present invention. Apparently, the embodiments described below are merely a part, but not all, of the embodiments of the present invention. All of the other embodiments, obtained by those of ordinary skill in the art based on the embodiments of the present invention without any creative effort, fall into the protection scope of the present invention.

The embodiments of the present invention provide a method, an apparatus and a system for service establishment for a multi-mode user equipment. Detailed illustration will be given below respectively.

Embodiment 1

The present embodiment will be described from a perspective of a centralized control entity (Controller).

A method for service establishment for a multi-mode user equipment, includes: receiving a service request sent by a first multi-mode user equipment, wherein the service request carries an identity of the first multi-mode user equipment, a service type and information about quality of service required by a service; obtaining base station information of respective base stations in a multi-RAT network, wherein the base station information includes information about load of a base station and information about quality of service of a service that the base station can provide; determining target base station information according to the service request and the base station information; and initiating bearer establishment for the service according to the target base station information, or sending the target base station information to the first multi-mode user equipment, such that the first multi-mode user equipment initiates bearer establishment for the service according to the target base station information.

Figure 1:
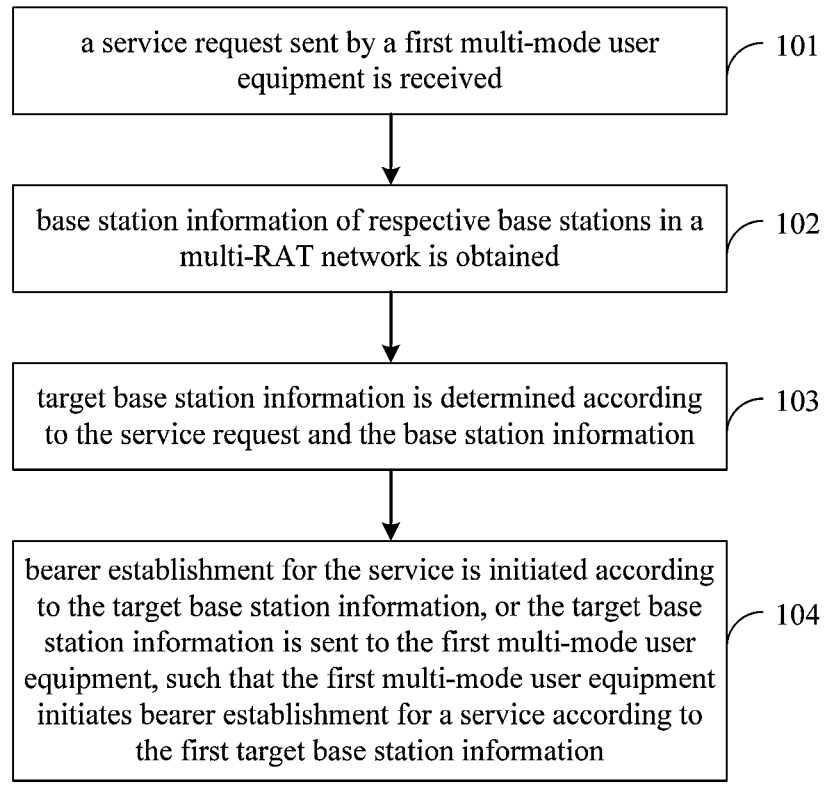
FIG. 1 is a flowchart of a method for service establishment for a multi-mode user equipment provided by an embodiment of the present invention.

As shown in FIG. 1, a specific flow may be as follows:

101, a service request sent by a first multi-mode user equipment is received.

The service request may carry an identity of the first multi-mode user equipment, a service type and information about QoS required by a service.

Optionally, the service request may further carry information such as a base station set A1 where the first multi-mode user equipment has resided, selection of user experience (e.g., cheapest, fastest and/or the like) and/or the like, wherein the base station set A1 where the first multi-mode user equipment has resided may include information of each base station in the set A1, such as public land mobile network (PLMN) identity information, base station technology, base station identity and/or the like.

In addition, if the first multi-mode user equipment initiates a new service towards a second multi-mode user equipment, besides carrying the identity of the first multi-mode user equipment, the service type, the information about QoS required by the service and the base station set A1 where the first multi-mode user equipment has resided, the service request may also carry an identity of the second multi-mode user equipment, and certainly, the service request may optionally also carry other information such as selection of user experience and/or the like.

102, base station information of respective base stations in a multi-RAT network is obtained.

The base station information may include information such as information on load of a base station, information on quality of service of a service that the base station can provide and/or the like, wherein the information on quality of service of the service that the base station can provide may include information such as charging standards and supported rates of different operators and different technologies and/or the like.

When the base station information of the respective base stations in the multi-RAT network is obtained, base station information of all base stations in the multi-RAT network may be specifically obtained, or base station information of a part of base stations in the multi-RAT network may be obtained. For example, a specific implementation may be as follows:

capability information, subscription data and position information of the first multi-mode user equipment is obtained according to the identity of the first multi-mode user equipment; network coverage information of the respective base stations in the multi-RAT network is obtained; a base station set B1 where the first multi-mode user equipment can reside is determined according to the capability information, the subscription data and the position information of the first multi-mode user equipment and the network coverage information; and base station information of respective base stations in the base station set B1 where the first multi-mode user equipment can reside is obtained. The base station set A1 where the first multi-mode user equipment has resided is a subset of the base station set B1 where the first multi-mode user equipment can reside.

Optionally, in order to reduce signaling procedure and improve processing efficiency, a target base station may be firstly selected from the base station set A1 where the first multi-mode user equipment has resided, and if no target base station is selected, the step of obtaining base station information of respective base stations in a multi-RAT network is performed. Wherein the base station set A1 where the first multi-mode user equipment has resided may be provided to the centralized control entity by the first multi-mode user equipment, that is, if the service request further carries the base station set A1 where the first multi-mode user equipment has resided, the method may further include:

obtaining base station information of respective respective base stations in the base station set A1 where the first multi-mode user equipment has resided; selecting, according to the service request and the base station information of the respective respective base stations in the base station set A1 where the first multi-mode user equipment has resided, a target base station from the base station set A1 where the first multi-mode user equipment has resided; if a target base station can be selected from the base station set A1 where the first multi-mode user equipment has resided, initiating establishment of a service bearer towards the target base station; and if a target base station cannot be selected from the base station set A1 where the first multi-mode user equipment has resided, performing the step of obtaining base station information of respective base stations in a multi-RAT network, namely performing step 102.

Optionally, if the service request involves another user equipment, the identity of the involved another user equipment in this case may be further carried in the service request, such that target base station information for the another user equipment is selected. For example, if the first multi-mode user equipment initiates a new service towards a second multi-mode user equipment, namely, in step 101, the received service request may further carry a base station set A1 where the first multi-mode user equipment has resided and an identity of the second multi-mode user equipment, in this case, after the service request sent by the first multi-mode user equipment is received, the method may further include:

paging the second multi-mode user equipment via the respective base stations in the multi-radio access technology network; sending a residence information inquiry request to the second multi-mode user equipment, so as to obtain a base station set A2 where the second multi-mode user equipment has resided; obtaining base station information of respective respective base stations in the base station set A1 where the first multi-mode user equipment has resided and base station information of respective respective base stations in the base station set A2 where the second multi-mode user equipment has resided; selecting, according to the service request and the base station information of the respective respective base stations in the base station set where the first multi-mode user equipment has resided, a first target base station from the base station set A1 where the first multi-mode user equipment has resided; selecting, according to the service request and the base station information of the respective respective base stations in the base station set where the second multi-mode user equipment has resided, a second target base station from the base station set A2 where the second multi-mode user equipment has resided; if a first target base station can be selected from the base station set A1 where the first multi-mode user equipment has resided and a second target base station can be selected from the base station set A2 where the second multi-mode user equipment has resided, initiating bearer establishment for the service towards the first target base station and the second target base station respectively; and if a first target base station cannot be selected from the base station set A1 where the first multi-mode user equipment has resided or a second target base station cannot be selected from the base station set A2 where the second multi-mode user equipment has resided, performing the step of obtaining base station information of the respective base stations in a multi-radio access technology network, namely performing step 102.

In this case, the step of obtaining base station information of respective base stations in a multi-RAT network (i.e., step 102) may be specifically implemented as follows:

obtaining capability information, subscription data and position information of the first multi-mode user equipment according to the identity of the first multi-mode user equipment, obtaining capability information, subscription data and position information of the second multi-mode user equipment according to the identity of the second multi-mode user equipment, and obtaining network coverage information of the respective base stations in the multi-RAT network; and then, in one aspect, determining, according to the capability information, the subscription data and the position information of the first multi-mode user equipment and the obtained network coverage information of the respective base stations in the multi-RAT network, a base station set B1 where the first multi-mode user equipment can reside, and in another aspect, determining, according to the capability information, the subscription data and the position information of the second multi-mode user equipment and the network coverage information of the respective base stations in the multi-RAT network, a base station set B2 where the second multi-mode user equipment can reside; and finally, obtaining base station information of respective respective base stations in the base station set B1 where the first multi-mode user equipment can reside, and obtaining base station information of respective respective base stations in the base station set B2 where the second multi-mode user equipment can reside. The base station set A2 where the second multi-mode user equipment has resided is a subset of the base station set B2 where the second multi-mode user equipment can reside.

103, target base station information is determined according to the service request received in step 101 and the base station information obtained in step 102.

Proper target base station information may be specifically selected from the base station set B1 where the first multi-mode user equipment can reside. Certainly, if it has been determined before step 103 that there does not exists proper target base station information in the base station set A1 where the first multi-mode user equipment has resided, in order to improve processing efficiency, in this case, proper target base station information may also be selected from a difference set of the base station set B1 where the first multi-mode user equipment can reside and the base station set A1 where the first multi-mode user equipment has resided. Similarly, if the service involves other user equipment, and for example, a second multi-mode user equipment is involved, when a target base station is selected for the second multi-mode user equipment, besides being directly selected from the base station set B2 where the second multi-mode user equipment can reside, the target base station may also be selected from a difference set of the base station set B2 where the second multi-mode user equipment can reside and the base station set A2 where the second multi-mode user equipment has resided, wherein the target base station information may be a target base station and may also be a target base station list. For example, the step 103 may be specifically implemented as follows:

(1) target base station information is selected from the base station set B1 where the first multi-mode user equipment can reside.

1. according to the service request and the base station information of the respective respective base stations in the base station set B1 where the first multi-mode user equipment can reside, a target base station is selected from the base station set B1 where the first multi-mode user equipment can reside.

2. according to the service request and the base station information of the respective base stations in the base station set B1 where the first multi-mode user equipment can reside, a plurality of target base stations are selected from the base station set B1 where the first multi-mode user equipment can reside, and a target base station list is obtained.

(2) target base station information is selected from a difference set of the base station set B1 where the first multi-mode user equipment can reside and the base station set A1 where the first multi-mode user equipment has resided.

1. according to the service request and the base station information of the respective base stations in the base station set where the first multi-mode user equipment can reside, a target base station is selected from a difference set of the base station set where the first multi-mode user equipment can reside and the base station set where the first multi-mode user equipment has resided.

2. according to the service request and the base station information of the respective base stations in the base station set where the first multi-mode user equipment can reside, a plurality of target base stations are selected from a difference set of the base station set where the first multi-mode user equipment can reside and the base station set where the first multi-mode user equipment has resided, and a target base station list is obtained.

(3) first target base station information is selected from a difference set of the base station set B1 where the first multi-mode user equipment can reside and the base station set A1 where the first multi-mode user equipment has resided, and second target base station information is selected from a difference set of the base station set B2 where the second multi-mode user equipment can reside and the base station set A2 where the second multi-mode user equipment has resided.

1. according to the service request and the base station information of the respective base stations in the base station set where the first multi-mode user equipment can reside, a first target base station is selected from a difference set of the base station set where the first multi-mode user equipment can reside and the base station set where the first multi-mode user equipment has resided; and according to the service request and the base station information of the respective base stations in the base station set where the second multi-mode user equipment can reside, a second target base station is selected from a difference set of the base station set where the second multi-mode user equipment can reside and the base station set where the second multi-mode user equipment has resided.

2. according to the service request and the base station information of the respective base stations in the base station set where the first multi-mode user equipment can reside, a plurality of first target base stations are selected from a difference set of the base station set where the first multi-mode user equipment can reside and the base station set where the first multi-mode user equipment has resided, and a first target base station list is obtained;

according to the service request and the base station information of the respective base stations in the base station set where the second multi-mode user equipment can reside, a plurality of second target base stations are selected from a difference set of the base station set where the second multi-mode user equipment can reside and the base station set where the second multi-mode user equipment has resided, and a second target base station list is obtained.

104, bearer establishment for the service is initiated according to the target base station information obtained in step 103, or the target base station information obtained in step 103 is sent to the first multi-mode user equipment, such that the first multi-mode user equipment initiates bearer establishment for a service according to the target base station information. For example, the step 104 may be specifically implemented as follows:

bearer establishment for the service is initiated towards the target base station;

or, the target base station list is sent to the first multi-mode user equipment, such that the first multi-mode user equipment determines a target base station according to a target base station list and initiates bearer establishment for the service towards the target base station.

In addition, if the target base station information of the second multi-mode user equipment is also determined in step 103, in this case, step 104 may be specifically implemented as follows:

bearer establishment for the service is initiated towards the first target base station and the second target base station respectively;

or, the first target base station list is sent to the first multi-mode user equipment, such that the first multi-mode user equipment determines a first target base station according to the first target base station list and initiates establishment of a service bearer towards the first target base station.

In addition, in this case, the method may further include:

sending the second target base station list to the second multi-mode user equipment, such that the second multi-mode user equipment determines a second target base station according to the second target base station list and initiates bearer establishment for the service towards the second target base station.

The target base station information, such as, for example, a target base station list, may be sent to the first multi-mode user equipment in a form of independent signaling, or sent to the first multi-mode user equipment by being carried in a service request response. The target base station list may include information of each base station in the list such as PLMN information, base station technology, frequency point, base station identity and/or the like.

It should be noted that, after determining the target base station, besides directly initiating bearer establishment for the service towards the target base station, the centralized control entity may also send the target base station to a user equipment (e.g., the first multi-mode user equipment and/or the second multi-mode user equipment), and the user equipment initiates bearer establishment for the service towards the target base station. Of course, if the centralized control entity directly initiates bearer establishment for the service towards the target base station, signaling procedure may be saved and thus being more optimal.

Optionally, after the bearer establishment for the service is initiated according to the target base station information, the method may further include:

sending a service request response to the first multi-mode user equipment, wherein the service request response carries a public land mobile network (PLMN) identity, a technology, a frequency point, a base station identity of the target base station and/or the like.

In addition, it should be further noted that, if the target base station could not be found, a service request reject message may be sent to the first multi-mode user equipment, so as to reject present service request of the first multi-mode user equipment, which will not be described redundantly herein.

As can be seen from the above, in the present embodiment, the service request, which is sent by the first multi-mode user equipment and carries the identity of the first multi-mode user equipment, the service type and the information about QoS required by the service, is received, the base station information of the respective base stations in the multi-RAT network is obtained, the target base station information is determined according to the service request and the base station information, and bearer establishment for the service is initiated according to the target base station information, or the target base station information is sent to the first multi-mode user equipment, such that the first multi-mode user equipment initiates bearer establishment for the service according to the target base station information. Since the centralized control entity in the solution may obtain the base station information of the respective base stations in the multi-RAT network in real time and select proper RAT base station information in accordance with service demand of the user equipment, so as to initiate bearer establishment for the service. Compared with the prior art which only aims at a particular service and handover can only be performed in particular RAT networks, the present solution does not has particular limitation on a service, and moreover, a proper RAT network may be selected from multiple RAT networks more flexibly for each service without increasing power consumption of the user equipment, thus having wider adaptability.

Embodiment 2

The present embodiment will be described from a perspective of a user equipment. The user equipment may be served as a first multi-mode user equipment in the embodiment of the present invention. The user equipment may be specifically a terminal device such as a mobile phone, a tablet computer or the like.

A method for service establishment for a multi-mode user equipment, includes: sending a service request to a centralized control entity, wherein the service request carries an identity of a first multi-mode user equipment, a service type and information about QoS required by a service; receiving target base station information sent by the centralized control entity according to the service request; and initiating bearer establishment for the service according to the target base station information.

Figure 2:
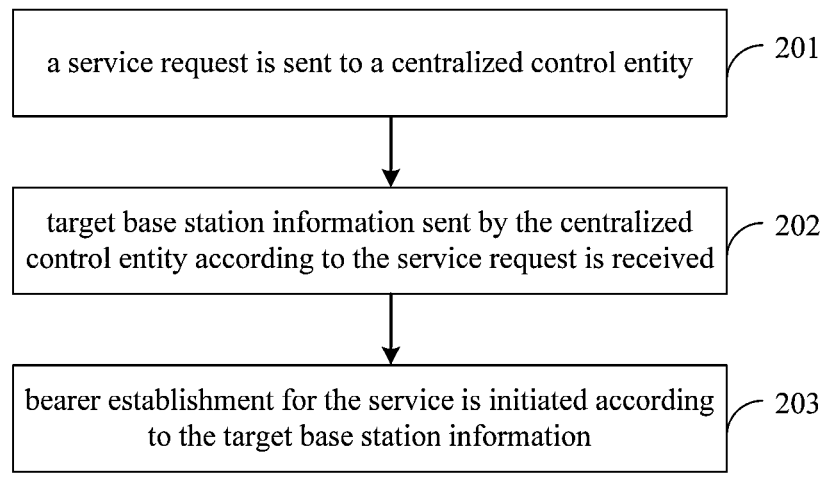
FIG. 2 is another flowchart of a method for service establishment for a multi-mode user equipment provided by an embodiment of the present invention.

As shown in FIG. 2, a specific flow may be as follows:

201. a service request is sent to a centralized control entity.

The service request carries an identity of the first multi-mode user equipment, a service type and information about QoS required by a service.

Optionally, the service request may further carry information such as a base station set A1 where the first multi-mode user equipment has resided, selection of user experience (e.g., cheapest, fastest and/or the like) and/or the like, wherein the base station set A1 where the first multi-mode user equipment has resided may include information of each base station in the set A1, such as PLMN information, base station technology, base station identity and/or the like.

In addition, if the first multi-mode user equipment initiates a new service towards the second multi-mode user equipment, besides carrying the identity of the first multi-mode user equipment, the service type, the information about QoS required by the service and the base station set A1 where the first multi-mode user equipment has resided, the service request may also carry an identity of the second multi-mode user equipment, and certainly, the service request may optionally also carry other information such as selection of user experience and/or the like.

202, target base station information sent by the centralized control entity according to the service request is received.

For example, a target base station sent by the centralized control entity according to the service request may be specifically received, or a target base station list sent by the centralized control entity according to the service request may be received.

Embodiment 1 may be referred to for a method for determining the target base station or the target base station list, which will not be repeated redundantly herein.

203, bearer establishment for the service is initiated according to the target base station information.

For example, bearer establishment for the service may be specifically initiated according to the target base station received in step 202; or, if a target base station list is received, a target base station may be selected from the target base station list, and bearer establishment for the service is then initiated according to the target base station.

A method for initiating bearer establishment for the service according to the target base station may be specifically implemented as follows:

determining whether the user equipment has attached to a network to which the target base station belongs; if the user equipment has attached to the network, handing over to the target base station, and initiating bearer establishment for the service towards the target base station; and if the user equipment has not attached to the network, initiating bearer establishment for the service towards the target base station after being attached to the network to which the target base station belongs.

As can be seen from the above, in the present embodiment, the service request, which is sent by the first multi-mode user equipment and carries the identity of the first multi-mode user equipment, the service type and the information about QoS required by the service, is sent to the centralized control entity, the target base station information sent by the centralized control entity is received, and bearer establishment for the service is then initiated according to the target base station information. Since the centralized control entity in the solution may obtain the base station information of the respective base stations in the multi-RAT network in real time and select proper RAT base station information in accordance with service demand of the user equipment, so as to initiate bearer establishment for the service. Compared with the prior art which only aims at a particular service and handover can only be performed in particular RAT networks, the present solution does not has particular limitation on a service, and moreover, a proper RAT network may be selected from multiple RAT networks more flexibly for each service without increasing power consumption of the user equipment, thus having wider adaptability.

The method described according to embodiment 1 and embodiment 2 will be illustrated in detail by way of examples in the following embodiment 3, embodiment 4 and embodiment 5.

Embodiment 3

In the present embodiment, it is taken as an example for illustration that the first multi-mode user equipment is specifically user equipment A and the target base station is determined by the user equipment.

Figure 3A:
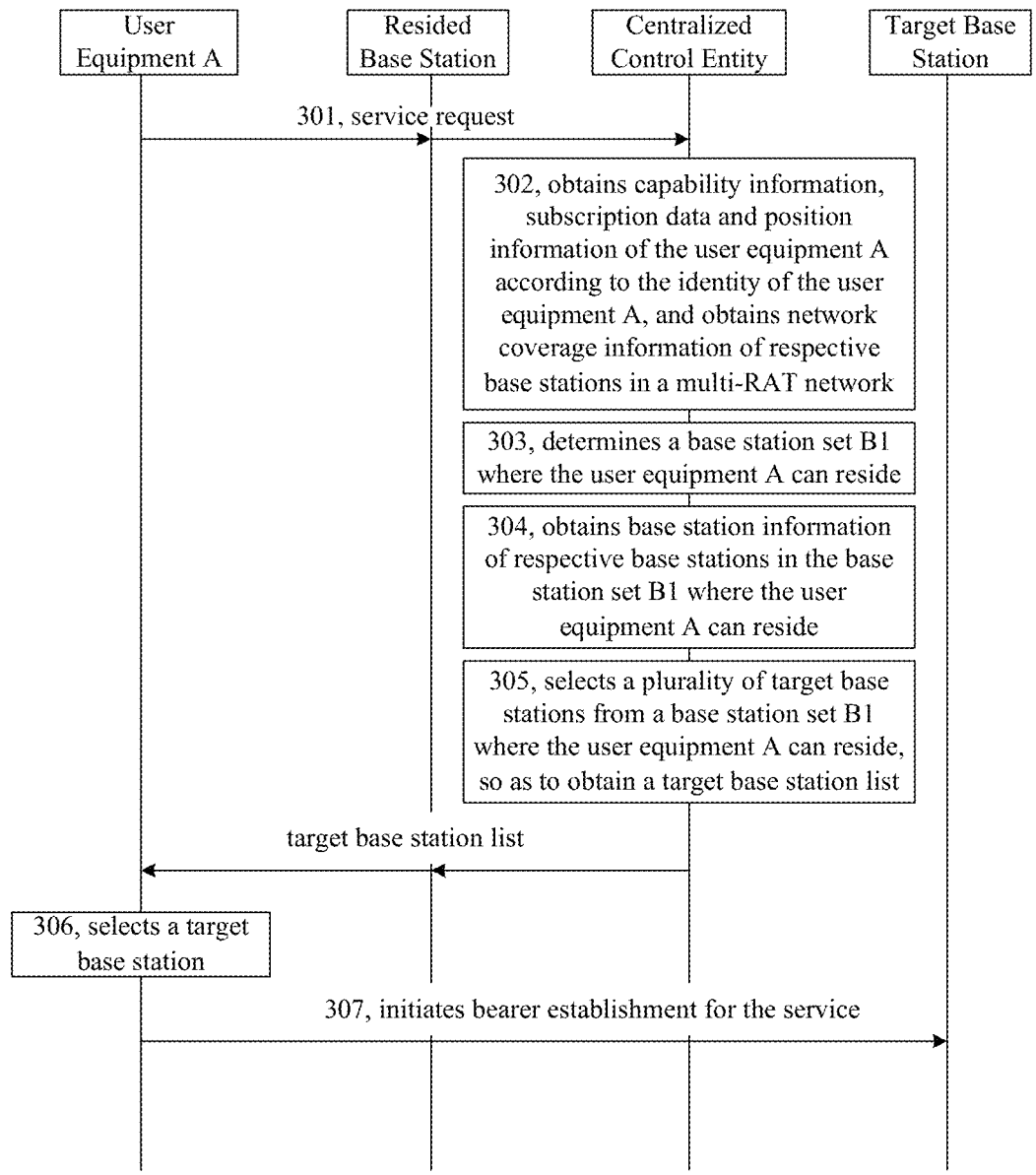
FIG. 3a is a third flowchart of a method for service establishment for a multi-mode user equipment provided by an embodiment of the present invention.

As shown in FIG. 3a, a specific flow of a method for service establishment for a multi-mode user equipment may be as follows:

301, when the user equipment A initiates a new service, the user equipment A sends a service request to a centralized control entity through a base station where the user equipment has resided.

The service request may carry an identity of the user equipment A, a service type and information about QoS required by the service.

302, after receiving the service request, the centralized control entity obtains capability information, subscription data and position information of the user equipment A according to the identity of the user equipment A, and obtains network coverage information of respective base stations in a multi-RAT network.

303, according to the capability information, the subscription data and the position information of the user equipment A and the obtained network coverage information of the respective base stations in the multi-RAT network, the centralized control entity determines a base station set B1 where the user equipment A can reside.

Figure 3B:
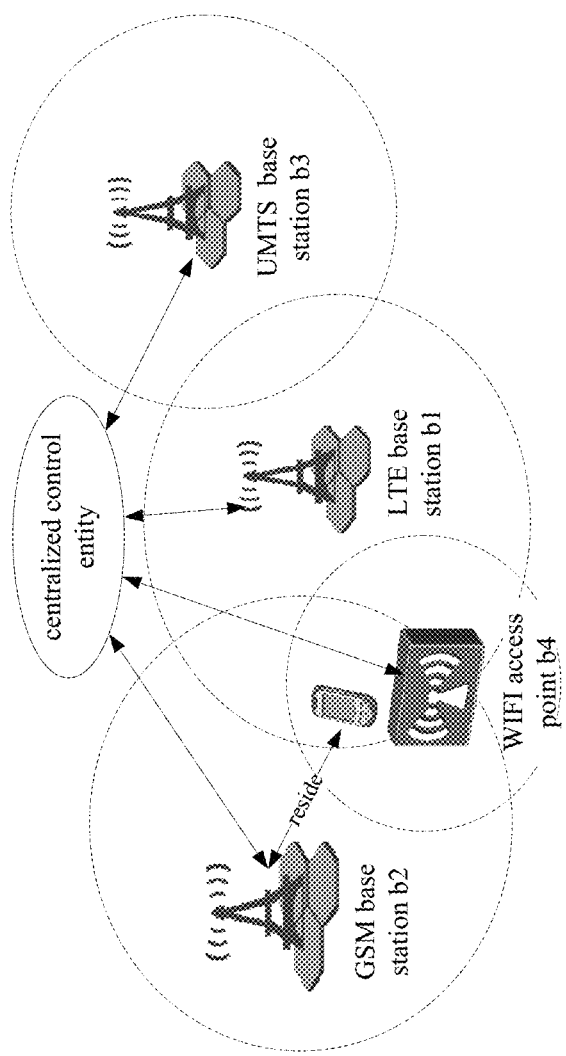
FIG. 3b is a schematic diagram of a scenario of a method provided by an embodiment of the present invention.

For example, as shown in FIG. 3b, there are four networks in a certain area: an LTE base station b1, a GSM base station b2, a UMTS base station b3 and a WIFI access point b4, wherein coverage areas of the four networks are overlapped, and the centralized control entity can control the base stations b1, b2, b3 and b4. The user equipment A has GSM, UMTS, LTE and WIFI capability, and the user equipment A resides in the GSM base station b2 at the moment. A base station where the user equipment A has resided is marked as a base station set A1 where the user equipment A has resided, and in this case, A1={b2}. It should be noted that, the user equipment A may also simultaneously reside in multiple networks.

According to the capability information, the subscription data and the position information of the user equipment A and the obtained network coverage information of the respective base stations in the multi-RAT network, the centralized control entity determines that the base station set B1 where the user equipment A can reside at the moment is {b1,b2,b4}.

It can be seen that the base station set A1 where the user equipment A has resided is a subset of the base station set B1 where the user equipment A can reside, namely, A1 ⊂ B1.

It should be noted that, the respective base stations in the base station set A1 where the user equipment A has resided and the respective base stations in the base station set B1 where the user equipment A can reside may be different base stations of a same operator and a same technology, or may be base stations of different operators and different technologies, or may be different base stations of different operators and a same technology.

304, the centralized control entity obtains base station information of respective base stations in the base station set B1 where the user equipment A can reside.

For example, if the base station set B1 where the user equipment A can reside is {b1,b2,b4}, in this case, base station information of the base station b1, base station information of the base station b2 and base station information of the base station b4 may be respectively obtained.

The base station information may include information such as information on load of a base station, information on quality of service of a service that a base station can provide and/or the like, wherein the information on quality of service of a service that the base station can provide may include information such as charging standards and supported rates of different operators and different technologies and/or the like.

305, the centralized control entity selects a plurality of target base stations from a base station set B1 where the user equipment A can reside, so as to obtain a target base station list, and sends the obtained target base station list to the user equipment A.

For example, the target base station list may specifically be sent to the user equipment A via a service request response, wherein the target base station list includes information of each base station in the list such as PLMN information, base station technology, frequency point, base station identity and/or the like.

For example, if the base station set B1 where the user equipment A can reside is {b1, b2, b4}, and the target base stations selected by the centralized control entity from the base station set B1 are base station b1, base station b2 and base station b4, in this case, the target base station list may include information of b1, b2 and b4, respectively, such as PLMN information, base station technology, frequency point, base station identity and/or the like. For another example, if the target base stations selected by the centralized control entity from the base station set B1 are the base station b1 and the base station b4, in this case, the target base station list may include information of b1 and b4, respectively, such as the PLMN information, base station technology, frequency point, base station identity and/or the like.

It should be noted that, if there is no proper target base station, the centralized control entity may send a service request reject message to the user equipment A, so as to reject the present service request of the user equipment A.

306, after receiving the target base station list, the user equipment A selects a target base station from the target base station list.

For example, a base station set A1 where the user equipment A has resided may be specifically obtained, and preferably, a target base station is selected from the base station set A1 where the user equipment A has resided. If a proper target base station cannot be selected from the base station set A1 where the user equipment A has resided, a proper target base station is selected from a difference set of the base station set B1 where the user equipment A can reside and the base station set A1 where the user equipment A has resided, namely, from B1-A1.

For example, if the received target base station list is b1, b2 and b4, and the base station set A1 where the user equipment A has resided is {b2}, in this case, the base station b2 may be preferably selected as the target base station, and if the base station b2 could not satisfy requirements of the user equipment A, the user equipment A may select a proper target base station from B1-A1, and for example, the user equipment selects the base station b1 or the like.

307, the user equipment A determines whether itself (i.e., the user equipment A) has attached to a network to which the target base station belongs; if the user equipment has attached to the network, the user equipment hands over to the target base station and initiates bearer establishment for the service towards the target base station; and if the user equipment has not attached to the network, the user equipment initiates bearer establishment for the service towards the target base station after being attached to the network to which the target base station belongs.

For example, if the target base station determined in step 306 is the base station b1, in this case, the user equipment A may determine whether itself has attached to a network to which the base station b1 belongs. Since the user equipment A has not attached to the network to which the base station b1 belongs, the user equipment A needs to firstly attach to the network to which the base station b1 belongs, and then initiate bearer establishment for the service towards the base station b1.

For another example, if the target base station determined in step 306 is the base station b2, since the user equipment A has attached to a network to which the base station b2 belongs, and the base station b2 belongs to the base station set A1 where the user equipment A has resided, in this case, the user equipment does not need to perform base station handover, and directly initiates bearer establishment for the service towards the base station b2 instead. It should be noted that, although the user equipment A has attached to the network to which the base station b2 belongs, if the base station b2 does not belong to the base station set A1 where the user equipment A has resided, the user equipment A needs to hand over to the base station b2, and then initiate bearer establishment for the service towards the base station b2.

As can be seen from the above, in the present embodiment, the centralized control entity may receive the service request which is sent by the user equipment A and carries the identity of the first multi-mode user equipment, the service type and the information about QoS required by the service, obtain the base station information of the respective base stations in the multi-RAT network, and then obtain the target base station list according to the service request and the base station information, and send the target base station list to the user equipment A. The user equipment A determines the target base station according to the target base station list and initiates bearer establishment for the service according to the target base station. Since the centralized control entity in the solution may obtain the base station information of the respective base stations in the multi-RAT network in real time and select proper RAT base station information in accordance with service demand of the user equipment, so as to initiate bearer establishment for the service. Compared with the prior art which only aims at a particular service and handover can only be performed in particular RAT networks, the present solution does not has particular limitation on a service, and moreover, a proper RAT network may be selected from multiple RAT networks more flexibly for each service without increasing power consumption of the user equipment, thus having wider adaptability.

Embodiment 4

In the present embodiment, same as in embodiment 3, it is taken as an example for illustration that the first multi-mode user equipment is specifically user equipment A, and difference between the present embodiment and embodiment 3 lies in that, in the present embodiment, it is taken as an example for illustration that the target base station is determined by the centralized control entity.

Figure 4:
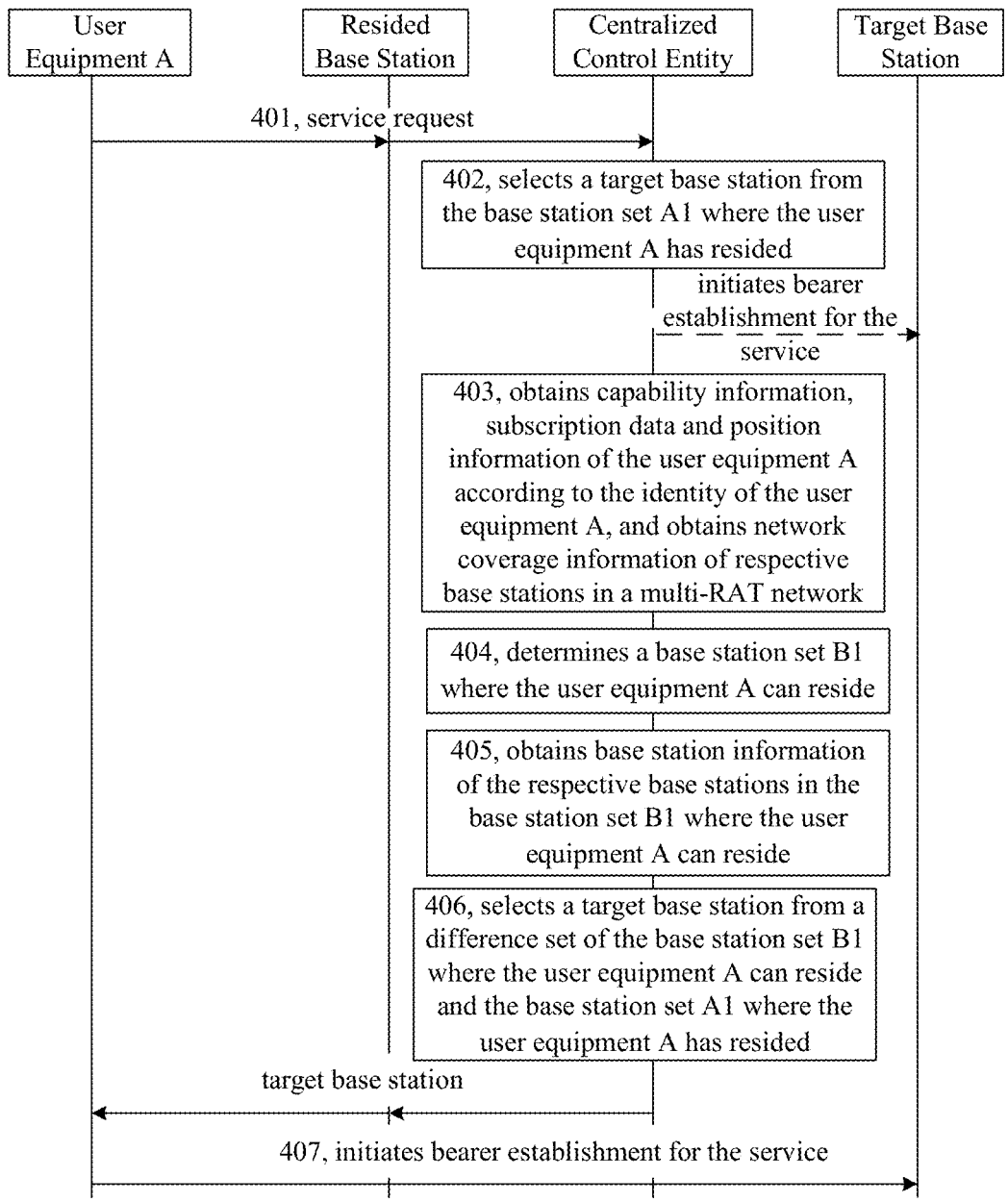
FIG. 4 is a third flowchart of a method for service establishment for a multi-mode user equipment provided by an embodiment of the present invention.

As shown in FIG. 4, a specific flow of a method for service establishment for a multi-mode user equipment may be as follows:

401, when the user equipment A initiates a new service, the user equipment A sends a service request to a centralized control entity through a base station where the user equipment has resided.

The service request may carry an identity of the user equipment A, a service type, information about QoS required by the service and a base station set A1 where the user equipment A has resided. In addition, the service request may also carry other information such as, for example, selection of user experience and/or the like.

402, after receiving the service request, the centralized control entity obtains base station information of respective base stations in the base station set A1 where the user equipment A has resided; selects, according to the service request and the base station information of the respective base stations in the base station set A1 where the user equipment A has resided, a target base station from the base station set A1 where the user equipment A has resided; if the target base station can be selected from the base station set A1 where the user equipment A has resided, the centralized control entity initiates bearer establishment for the service towards the target base station, and the flow is terminated; and if the target base station cannot be selected from the base station set A1 where the user equipment A has resided, the centralized control entity performs step 403.

403, the centralized control entity obtains capability information, subscription data and position information of the user equipment A according to the identity of the user equipment A, and obtains network coverage information of respective base stations in a multi-RAT network.

404, the centralized control entity determines, according to the capability information, the subscription data and the position information of the user equipment A and the obtained network coverage information of the respective base stations in the multi-RAT network, a base station set B1 where the user equipment A can reside.

For example, as shown in FIG. 3b, there are four networks in a certain area: an LTE base station b1, a GSM base station b2, a UMTS base station b3 and a WIFI access point b4, wherein coverage areas of the four networks are overlapped, and the centralized control entity can control the base stations b1, b2, b3 and b4. The user equipment A has GSM, UMTS, LTE and WIFI capability, and the user equipment A resides in the GSM base station b2 at the moment. A base station where the user equipment A has resided is marked as a base station set A1 where the user equipment A has resided, and in this case, A1={b2}. It should be noted that, the user equipment A may also simultaneously reside in multiple networks.

According to the capability information, the subscription data and the position information of the user equipment A and the obtained network coverage information of the respective base stations in the multi-RAT network, the centralized control entity determines that the base station set B1 where the user equipment A can reside at the moment is {b1,b2,b4}.

It can be seen that the base station set A1 where the user equipment A has resided is a subset of the base station set B1 where the user equipment A can reside, namely, A1⊂B1.

It should be noted that, the respective base stations in the base station set A1 where the user equipment A has resided and the respective base stations in the base station set B1 where the user equipment A can reside may be different base stations of a same operator and a same technology, or may be base stations of different operators and different technologies, or may be different base stations of different operators and a same technology.

405, the centralized control entity obtains base station information of the respective base stations in the base station set B1 where the user equipment A can reside.

For example, if the base station set B1 where the user equipment A can reside is {b1,b2,b4}, in this case, base station information of the base station b1, base station information of the base station b2 and base station information of the base station b4 may be respectively obtained.

The base station information may include information such as information on load of a base station, information on quality of service of a service that a base station can provide and/or the like, wherein the information on quality of service of the service that the base station can provide may include information such as charging standards and supported rates of different operators and different technologies and/or the like.

406, the centralized control entity selects a target base station from a difference set of the base station set B1 where the user equipment A can reside and the base station set A1 where the user equipment A has resided, and sends the target base station to the user equipment A.

For example, the target base station may specifically be sent to the user equipment A via a service request response, wherein the target base station may include information of the base station such as PLMN information, base station technology, frequency point, base station identity and/or the like.

For example, if the base station set A1 where the user equipment A has resided is {b2}, and the base station set B1 where the user equipment A can reside is {b1, b2, b4}, in this case, the centralized control entity may select a target base station from a base station set B1-A1, and select the base station b for example, in this case, information of the base station b, such as PLMN information, base station technology, frequency point, base station identity and/or the like, may be sent to the user equipment A.

It should be noted that, if there is no proper target base station, the centralized control entity may send a service request reject message to the user equipment A, so as to reject the present service request of the user equipment A.

407, after receiving the target base station, the user equipment A determines whether itself (i.e., the user equipment A) has attached to a network to which the target base station belongs; if the user equipment has attached to the network, the user equipment hands over to the target base station and initiates bearer establishment for the service towards the target base station; and if the user equipment A has not attached to the network, the user equipment initiates bearer establishment for the service towards the target base station after being attached to the network to which the target base station belongs.

For example, if the target base station is the base station b1, in this case, the user equipment A may determine whether itself has attached to the network to which the base station b1 belongs. Since the user equipment A has not yet attached to the network to which the base station b1 belongs, the user equipment A needs to firstly attach to the network to which the base station b1 belongs, and then initiate bearer establishment for the service towards the base station b1.

For another example, if the target base station is the base station b2, since the user equipment A has attached to the network to which the base station b2 belongs, and the base station b2 belongs to the base station set A1 where the user equipment A has resided, in this case, the user equipment does not need to hand over to another base station, and directly initiates bearer establishment for the service towards the base station b2 instead. It should be noted that, although the user equipment A has attached to the network to which the base station b2 belongs, if the base station b2 does not belong to the base station set A1 where the user equipment A has resided, the user equipment A needs to hand over to the base station b2, and then initiate bearer establishment for the service towards the base station b2.

As can be seen from the above, in the present embodiment, the centralized control entity may receive the service request which is sent by the user equipment A and carries the identity of the user equipment A, the service type, the information about QoS required by the service and the base station set A1 where the user equipment A has resided, obtain the base station information of the respective base stations in the multi-RAT network, and then obtain the target base station according to the service request and the base station information and send the target base station to the user equipment A. The user equipment A initiates bearer establishment for the service according to the target base station. Since the centralized control entity in the solution may obtain the base station information of the respective base stations in the multi-RAT network in real time and select proper RAT base station information in accordance with service demand of the user equipment, so as to initiate bearer establishment for the service. Compared with the prior art which only aims at a particular service and handover can only be performed in particular RAT networks, the present solution does not has particular limitation on a service, and moreover, a proper RAT network may be selected from multiple RAT networks more flexibly for each service without increasing power consumption of the user equipment, thus having wider adaptability.

Embodiment 5

In the present embodiment, same as in embodiment 4, it is taken as an example for illustration that the target base station is determined by the centralized control entity, and difference between the present embodiment and embodiment 4 lies in that, in the present embodiment the initiated service involves a second multi-mode user equipment. In the present embodiment, it is taken as an example for illustration that the first multi-mode user equipment is specifically user equipment A and the second multi-mode user equipment is specifically user equipment B.

Figure 5:
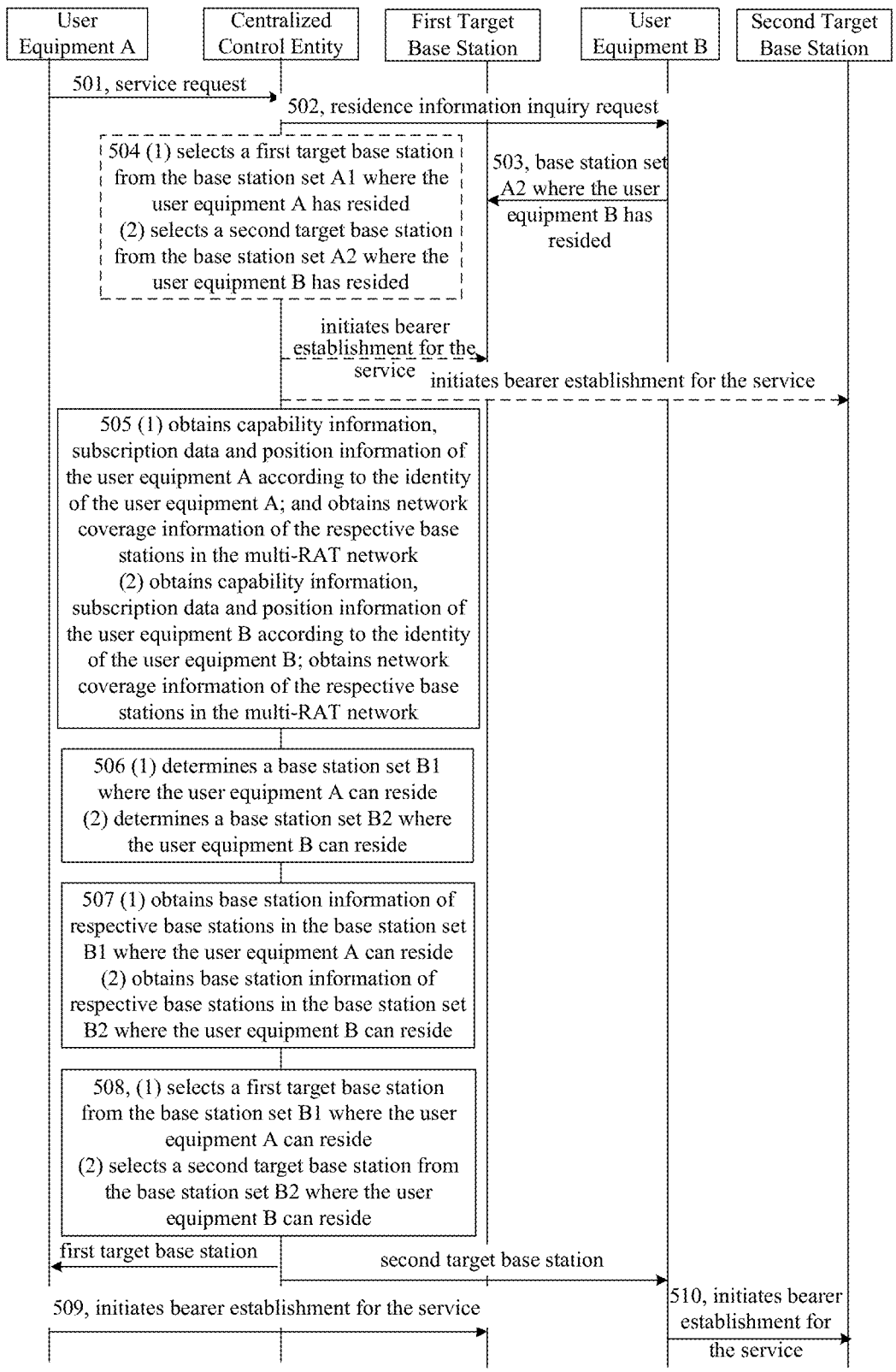
FIG. 5 is a third flowchart of a method for service establishment for a multi-mode user equipment provided by an embodiment of the present invention.

As shown in FIG. 5, a specific flow of a method for service establishment for a multi-mode user equipment may be as follows:

501, the user equipment A initiates a new service towards the user equipment B, and the user equipment A sends a service request to a centralized control entity through a base station where the user equipment has resided.

The service request may carry an identity of the user equipment A, an identity of the user equipment B, a service type, information about QoS required by the service and a base station set A1 where the user equipment A has resided. In addition, the service request may also carry other information such as selection of user experience and/or the like.

It should be noted that, for convenience of description, in FIG. 5, the base station where the user equipment A has resided and the base station where the user equipment B has resided are not shown. It should be understood that, both the user equipment A and the user equipment B may communicate with the centralized control entity through their respective resided base stations.

502, after receiving the service request, the centralized control entity may page the user equipment B via respective base stations in a multi-RAT network, and sends a residence information inquiry request to the user equipment B.

503, after receiving the residence information inquiry request, the user equipment B sends the centralized control entity a base station set A2 where the user equipment B has resided.

504, the centralized control entity respectively performs the following operations in no particular order:

(1) the centralized control entity obtains base station information of respective base stations in the base station set A1 where the user equipment A has resided; selects, according to the service request and the base station information of respective base stations in the base station set A1 where the user equipment A has resided, a first target base station from the base station set A1 where the user equipment A has resided; if the first target base station can be selected from the base station set A1 where the user equipment A has resided, the centralized control entity initiates bearer establishment for the service towards the first target base station; and if the first target base station cannot be selected from the base station set A1 where the user equipment A has resided, the centralized control entity performs (1) in step 505.

(2) the centralized control entity obtains base station information of respective base stations in the base station set A2 where the user equipment B has resided; selects, according to the service request and the base station information of respective base stations in the base station set A2 where the user equipment B has resided, a second target base station from the base station set A2 where the user equipment B has resided; if the second target base station can be selected from the base station set A2 where the user equipment B has resided, the centralized control entity initiates bearer establishment for the service towards the second target base station; and if the second target base station cannot be selected from the base station set A2 where the user equipment B has resided, the centralized control entity performs (2) in step 510.

It should be noted that, for convenience of description, in the embodiment of the present invention, a target base station of the user equipment A is called as the first target base station, and a target base station of the user equipment B is called as the second target base station. It should be understood that, no limitation is set to the above-mentioned names.

505, the centralized control entity performs the following operations in no particular order:

(1) the centralized control entity obtains capability information, subscription data and position information of the user equipment A according to the identity of the user equipment A; obtains network coverage information of the respective base stations in the multi-RAT network; and then performs (1) in step 506.

(2) The centralized control entity obtains capability information, subscription data and position information of the user equipment B according to the identity of the user equipment B; obtains network coverage information of the respective base stations in the multi-RAT network; and then performs (2) in step 506.

506, the centralized control entity performs the following operations in no particular order:

(1) according to the capability information, the subscription data and the position information of the user equipment A and the obtained network coverage information of the respective base stations in the multi-RAT network, the centralized control entity determines a base station set B1 where the user equipment A can reside, and then performs (1) in step 507.

(2) according to the capability information, the subscription data and the position information of the user equipment B and the obtained network coverage information of the respective base stations in the multi-RAT network, the centralized control entity determines a base station set B2 where the user equipment B can reside, and then performs (2) in step 507.

The base station set A1 where the user equipment A has resided is a subset of the base station set B1 where the user equipment A can reside, namely, $A1 \subset B1$; and the base station set A2 where the user equipment B has resided is a subset of the base station set B2 where the user equipment B can reside, namely, $A2 \subset B2$.

It should be noted that, the respective base stations in the base station set A1 where the user equipment A has resided, in the base station set A2 where the user equipment B has resided, in the base station set B1 where the user equipment A can reside and in the base station set B2 where the user equipment B can reside, may be different base stations of a same operator and a same technology, or may be base stations of different operators and different technologies, or may be different base stations of different operators and a same technology.

507, the centralized control entity performs the following operations in no particular order:

(1) the centralized control entity obtains base station information of respective base stations in the base station set B1 where the user equipment A can reside, and then performs (1) in step 508.

For example, if the base station set B1 where the user equipment A can reside is {b1,b2,b4}, in this case, base station information of the base station b1, base station information of the base station b2 and base station information of the base station b4 may be respectively obtained.

(2) The centralized control entity obtains base station information of respective base stations in the base station set B2 where the user equipment B can reside, and then performs (2) in step 508.

The base station information may include information such as information on load of a base station, information on quality of service of a service that the base station can provide and/or the like, wherein the information on quality of service of a service that the base station can provide may include information such as charging standards and supported rates of different operators and different technologies and/or the like.

508, the centralized control entity performs the following operations in no particular order:

(1) The centralized control entity selects a first target base station from a difference set of the base station set B1 where the user equipment A can reside and the base station set A1 where the user equipment A has resided, sends the first target base station to the user equipment A, and then performs step 509.

For example, the first target base station may specifically be sent to the user equipment A via a service request response, wherein the first target base station may include information of the base station such as PLMN information, base station technology, frequency point, base station identity and/or the like.

For example, if the base station set A1 where the user equipment A has resided is {b2}, and the base station set B1 where the user equipment A can reside is {b1, b2, b4}, the centralized control entity may select the first target base station from a base station set B1-A1, and send the user equipment A information of the first target base station such as PLMN information, base station technology, frequency point, base station identity and/or the like.

(2) The centralized control entity selects a second target base station from a difference set of the base station set B2 where the user equipment B can reside and the base station set A2 where the user equipment B has resided, sends the second target base station to the user equipment B, and then performs step 510.

For example, the second target base station may specifically be sent to the user equipment B via a service request response, wherein the second target base station may include information of the base station such as PLMN information, base station technology, frequency point, base station identity and/or the like.

For example, if the base station set A2 where the user equipment B has resided is {b5}, and the base station set B1 where the user equipment B can reside is {b5, b6, b7}, the centralized control entity may select the second target base station from a base station set B2-A2, and send the user equipment B information of the second target base station such as PLMN information, base station technology, frequency point, base station identity and/or the like.

It should be noted that, if there is no proper target base station (i.e., the first target base station and/or the second target base station), the centralized control entity may send a service request reject message to the user equipment A, so as to reject the present service request of the user equipment A.

509, after receiving the first target base station, the user equipment A determines whether itself (i.e., the user equipment A) has attached to a network to which the first target base station belongs; if the user equipment A has attached to the network, the user equipment A hands over to the first target base station and initiates bearer establishment for the service towards the first target base station; and if the user equipment A has not attached to the network, the user equipment A initiates bearer establishment for the service towards the first target base station after being attached to the network to which the first target base station belongs.

For example, if the target base station is the base station b1, in this case, the user equipment A may determine whether it has attached to the network to which the base station b1 belongs. Since the user equipment A has not yet attached to the network to which the base station b1 belongs, the user equipment A needs to firstly attach to the network to which the base station b1 belongs, and then initiate bearer establishment for the service towards the base station b1.

For another example, if the target base station is the base station b2, since the user equipment A has attached to the network to which the base station b2 belongs, and the base station b2 belongs to the base station set A1 where the user equipment A has resided, in this case, the user equipment does not need to hand over to another base station, and directly initiates bearer establishment for the service towards the base station b2 instead. It should be noted that, although the user equipment A has attached to the network to which the base station b2 belongs, if the base station b2 does not belong to the base station set A1 where the user equipment A has resided, the user equipment A needs to hand over to the base station b2, and then initiate bearer establishment for the service towards the base station b2.

510, after receiving the second target base station, the user equipment B determines whether itself (i.e., the user equipment B) has attached to a network to which the second target base station belongs; if the user equipment B has attached to the network, the user equipment B hands over to the second target base station and initiates bearer establishment for the service towards the second target base station; and if the user equipment B has not attached to the network, the user equipment B initiates bearer establishment for the service towards the second target base station after being attached to the network to which the second target base station belongs. The step is the same as step 509, and will not be repeated redundantly herein.

As can be seen from the above, in the present embodiment, the centralized control entity may receive the service request which is sent by the user equipment A and carries the identity of the user equipment A, the identity of the user equipment B, the service type, the information about QoS required by the service and the base station set A1 where the user equipment A has resided, obtain the base station information of the respective base stations in the multi-RAT network, and then select target base stations of the user equipment A and the user equipment B respectively according to the service request and the base station information, and send the target base stations to the user equipment A and the user equipment B, respectively. The user equipment A and the user equipment B initiate bearer establishment for the service according to the target base stations. Since the centralized control entity in the solution may obtain the base station information of the respective base stations in the multi-RAT network in real time and select proper RAT base station information in accordance with service demand of the user equipment, so as to initiate bearer establishment for the service. Compared with the prior art which only aims at a particular service and handover can only be performed in particular RAT networks, the present solution does not has particular limitation on a service, and moreover, a proper RAT network may be selected from multiple RAT networks more flexibly for each service without increasing power consumption of the user equipment, thus having wider adaptability.

Embodiment 6

Figure 6:
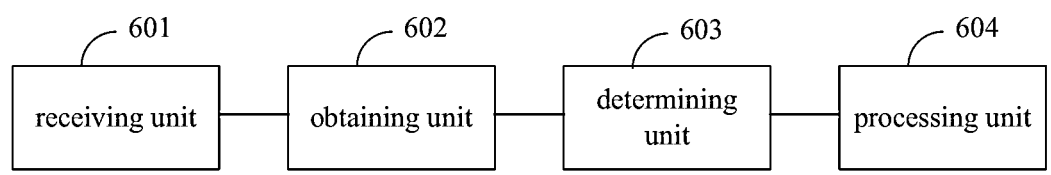
FIG. 6 is a schematic diagram of a structure of a network side device provided by an embodiment of the present invention.
Figure 7:
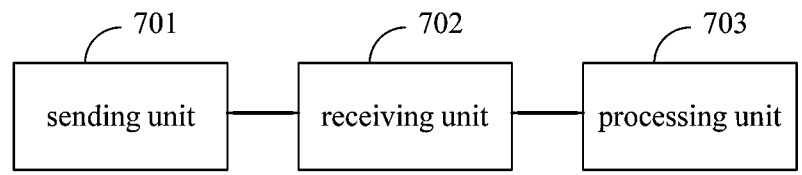
FIG. 7 is a schematic diagram of a structure of a user equipment provided by an embodiment of the present invention.

In order to better implement the above-mentioned respective methods, the embodiment of the present invention further provides a network side device, which may be served as the centralized control entity in the embodiment of the present invention. As shown in FIG. 6, the network side device includes a receiving unit 601, an obtaining unit 602, a determining unit 603 and a processing unit 604.

The receiving unit 601 is configured to receive a service request sent by a first multi-mode user equipment.

The service request may carry an identity of the first multi-mode user equipment, a service type and Information about QoS required by the service.

Optionally, the service request may further carry information such as a base station set A1 where the first multi-mode user equipment has resided, selection of user experience (e.g., cheapest, fastest and/or the like) and/or the like, wherein the base station set A1 where the first multi-mode user equipment has resided may include information of each base station in the set A1, such as PLMN identity information, base station technology, base station identity and/or the like.

In addition, if the first multi-mode user equipment initiates a new service towards a second multi-mode user equipment, besides carrying the identity of the first multi-mode user equipment, the service type, the information about QoS required by the service and the base station set A1 where the first multi-mode user equipment has resided, the service request may also carry an identity of the second multi-mode user equipment, and certainly, the service request may optionally also carry other information such as selection of user experience and/or the like.

The obtaining unit 602 is configured to obtain base station information of respective base stations in a multi-radio access technology network, wherein the base station information comprises information on load of a base station and information on quality of service of a service that the base station can provide; wherein the information on quality of service of the service that the base station can provide may include information such as charging standards and supported rates of different operators and different technologies and/or the like.

The determining unit 603 is configured to determine target base station information according to the service request and the base station information.

The processing unit 604 is configured to initiate bearer establishment for the service according to the target base station information, or send the target base station information to the first multi-mode user equipment, such that the first multi-mode user equipment initiates bearer establishment for the service according to the target base station information.

Optionally, when obtaining the base station information of the respective base stations in the multi-RAT network, the obtaining unit 602 may specifically obtain base station information of all base stations in the multi-RAT network, or obtain base station information of a part of base stations in the multi-RAT network. For example, it may be specifically as follows:

the obtaining unit 602 may be specifically configured to obtain capability information, subscription data and position information of the first multi-mode user equipment according to the identity of the first multi-mode user equipment; obtain network coverage information of the respective base stations in the multi-radio access technology network; determine, according to the capability information, the subscription data and the position information of the first multi-mode user equipment and the network coverage information, a base station set B1 where the first multi-mode user equipment can reside; and obtain base station information of respective respective base stations in the base station set B1 where the first multi-mode user equipment can reside;

the determining unit 603 may be specifically configured to select, according to the service request and the obtained base station information of the respective base stations in the base station set B1 where the first multi-mode user equipment can reside, a target base station from the base station set B1 where the first multi-mode user equipment can reside; and in this case, the processing unit 604 may be specifically configured to initiate bearer establishment for the service towards the target base station.

Or, besides directly determining the target base station by the centralized control entity, a plurality of target base stations may be selected from the base station set B1 where the first multi-mode user equipment can reside, so as to obtain a target base station list, and the target base station list is then provided to the user equipment, and the user equipment determines the target base station, that is, the determining unit 603 may also be specifically configured to select, according to the service request and the base station information of the respective base stations in the base station set where the first multi-mode user equipment can reside, a plurality of target base stations from the base station set B1 where the first multi-mode user equipment can reside, so as to obtain a target base station list; and in this case, the processing unit 604 may be specifically configured to send the target base station list to the first multi-mode user equipment, such that the first multi-mode user equipment determines a target base station according to the target base station list and initiates bearer establishment for the service towards the target base station.

Optionally, in order to reduce signaling procedure and improve processing efficiency, a target base station may be firstly selected from the base station set A1 where the first multi-mode user equipment has resided, and if no target base station is selected, the obtaining unit 602 performs the step of obtaining base station information of respective base stations in a multi-RAT network. The base station set A1 where the first multi-mode user equipment has resided may be provided to the centralized control entity by the first multi-mode user equipment, that is, if the service request further carries the base station set A1 where the first multi-mode user equipment has resided, the obtaining unit 602 may be further configured to obtain base station information of respective base stations in the base station set A1 where the first multi-mode user equipment has resided; and in this case, the determining unit 603 may be further configured to select, according to the service request and the base station information of the respective base stations in the base station set A1 where the first multi-mode user equipment has resided, a target base station from the base station set A1 where the first multi-mode user equipment has resided; and the processing unit 604 is further configured to, if a target base station can be selected from the base station set A1 where the first multi-mode user equipment has resided, initiate bearer establishment for the service towards the target base station; and if a target base station cannot be selected from the base station set A1 where the first multi-mode user equipment has resided, trigger the obtaining unit 602 to perform the step of obtaining base station information of respective base stations in a multi-radio access technology network.

Optionally, if it has been determined that there is no proper target base station information in the base station set A1 where the first multi-mode user equipment has resided, in this case, in order to improve the processing efficiency, proper target base station information may also be selected from a difference set (i.e., B1−A1) of the base station set B1 where the first multi-mode user equipment can reside and the base station set A1 where the first multi-mode user equipment has resided, that is, the determining unit 603 may be specifically configured to select, according to the service request and the base station information of the respective base stations in the base station set B1 where the first multi-mode user equipment can reside, a target base station from a difference set of the base station set B1 where the first multi-mode user equipment can reside and the base station set A1 where the first multi-mode user equipment has resided; and the processing unit 604 may be specifically configured to initiate bearer establishment for the service towards the target base station.

Or, besides directly determining the target base station by the centralized control entity, the target base station may also be determined by the user equipment, namely, the determining unit 603 is specifically configured to select, according to the service request and the base station information of the respective base stations in the base station set B1 where the first multi-mode user equipment can reside, a plurality of target base stations from a difference set of the base station set B1 where the first multi-mode user equipment can reside and the base station set A1 where the first multi-mode user equipment has resided, so as to obtain a target base station list; and the processing unit 604 may be specifically configured to send the target base station list to the first multi-mode user equipment, such that the first multi-mode user equipment determines a target base station according to the target base station list and initiates bearer establishment for the service towards the target base station.

In addition, optionally, if the service request involves another user equipment, in this case, an identity of the involved another user equipment may be further carried in the service request, so as to select target base station information for the another user equipment. For example, if the first multi-mode user equipment initiates a new service towards a second multi-mode user equipment, namely, in step 101, the received service request may further carry the base station set A1 where the first multi-mode user equipment has resided and the identity of the second multi-mode user equipment, in this case, the network side device further includes a paging unit and an inquiry unit; wherein the paging unit is configured to page the second multi-mode user equipment via the respective base stations in the multi-radio access technology network; and the inquiry unit is configured to a residence information inquiry request to the second multi-mode user equipment, so as to obtain a base station set A2 where the second multi-mode user equipment has resided.

In this case, the obtaining unit 602 may be further configured to obtain base station information of respective base stations in the base station set A1 where the first multi-mode user equipment has resided and base station information of respective base stations in the base station set A2 where the second multi-mode user equipment has resided;

the determining unit 603 may be further configured to select, according to the service request and the base station information of the respective base stations in the base station set A1 where the first multi-mode user equipment has resided, a first target base station from the base station set A1 where the first multi-mode user equipment has resided, and select, according to the service request and the base station information of the respective base stations in the base station set A2 where the second multi-mode user equipment has resided, a second target base station from the base station set A2 where the second multi-mode user equipment has resided; and the processing unit 604 may be further configured to, if a first target base station can be selected from the base station set A1 where the first multi-mode user equipment has resided and a second target base station can be selected from the base station set A2 where the second multi-mode user equipment has resided, initiate bearer establishment for the service towards the first target base station and the second target base station respectively; and if a first target base station cannot be selected from the base station set A1 where the first multi-mode user equipment has resided or a second target base station cannot be selected from the base station set A2 where the second multi-mode user equipment has resided, trigger the obtaining unit 602 to perform the step of obtaining base station information of the respective base stations in a multi-radio access technology network.

In this case, the obtaining unit 602 may specifically perform the step of obtaining base station information of respective base stations in a multi-RAT network as follows:

the obtaining unit 602 is specifically configured to obtain, according to the identity of the first multi-mode user equipment and the identity of the second multi-mode user equipment, capability information, subscription data and position information of the first multi-mode user equipment, and capability information, subscription data and position information of the second multi-mode user equipment, respectively; obtain network coverage information of the respective base stations in the multi-radio access technology network; determine, according to the capability information, the subscription data and the position information of the first multi-mode user equipment and the network coverage information, a base station set B1 where the first multi-mode user equipment can reside; determine, according to the capability information, the subscription data and the position information of the second multi-mode user equipment and the network coverage information, a base station set B2 where the second multi-mode user equipment can reside; and obtain base station information of respective base stations in the base station set B1 where the first multi-mode user equipment can reside, and obtain base station information of respective base stations in the base station set B2 where the second multi-mode user equipment can reside.

The determining unit 603 may be specifically configured to select, according to the service request and the base station information of the respective base stations in the base station set B1 where the first multi-mode user equipment can reside, a first target base station from a difference set B1 of the base station set where the first multi-mode user equipment can reside and the base station set A1 where the first multi-mode user equipment has resided; and select, according to the service request and the base station information of the respective base stations in the base station set B2 where the second multi-mode user equipment can reside, a second target base station from a difference set of the base station set B2 where the second multi-mode user equipment can reside and the base station set A2 where the second multi-mode user equipment has resided; and the processing unit 604 may be specifically configured to initiate bearer establishment for the service towards the first target base station and the second target base station respectively.

Or, besides the condition directly determining the target base station by the centralized control entity, the target base station may also be determined by the user equipment, namely, the determining unit 603 is specifically configured to select, according to the service request and the base station information of the respective base stations in the base station set B1 where the first multi-mode user equipment can reside, a plurality of first target base stations from a difference set of the base station set B1 where the first multi-mode user equipment can reside and the base station set A1 where the first multi-mode user equipment has resided, so as to obtain a first target base station list; and select, according to the service request and the base station information of the respective base stations in the base station set B2 where the second multi-mode user equipment can reside, a plurality of second target base stations from a difference set of the base station set B2 where the second multi-mode user equipment can reside and the base station set A2 where the second multi-mode user equipment has resided, so as to obtain a second target base station list; and the processing unit 604 is specifically configured to send the first target base station list to the first multi-mode user equipment, such that the first multi-mode user equipment determines a first target base station according to the first target base station list and initiates bearer establishment for the service towards the first target base station; and send the second target base station list to the second multi-mode user equipment, such that the second multi-mode user equipment determines a second target base station according to the second target base station list and initiates bearer establishment for the service towards the second target base station.

The target base station information, such as, for example, a target base station list, may be sent to the first multi-mode user equipment in a form of independent signaling, or sent to the first multi-mode user equipment by being carried in a service request response. The target base station list may include information of each base station in the list such as PLMN information, base station technology, frequency point, base station identity and/or the like.

It should be noted that, after the target base station is determined, besides directly initiating bearer establishment for the service towards the target base station, the processing unit 604 may also send the target base station to a user equipment (e.g., the first multi-mode user equipment and/or the second multi-mode user equipment), and the user equipment initiates bearer establishment for the service towards the target base station. Of course, if the centralized control entity directly initiates bearer establishment for the service towards the target base station, signaling procedure may be saved and thus being more optimal.

Optionally, the network side device may further include a response unit; wherein the response unit is configured to send, after the bearer establishment for the service is initiated according to the target base station information, a service request response to the first multi-mode user equipment, wherein the service request response carries a public land mobile network (PLMN) identity, a technology, a frequency point and a base station identity of the target base station.

In addition, it should be further noted that, if the target base station could not be found, the response unit may also send a service request reject message to the first multi-mode user equipment, so as to reject the present service request of the first multi-mode user equipment, which will not be repeated redundantly herein.

In a specific embodiment, the above-mentioned respective units may be implemented with independent entities, or be randomly combined to be implemented with a same or multiple entities. The foregoing method embodiments may be referred to for a specific implementation of the above-mentioned respective units, which will not be repeated redundantly herein.

As can be seen from the above, in the present embodiment, the receiving unit 601 of the network side device receives the service request, which is sent by the first multi-mode user equipment and carries the identity of the first multi-mode user equipment, the service type and the information about QoS required by the service, the obtaining unit 602 obtains the base station information of the respective base stations in the multi-RAT network, and then the determining unit 603 determines the target base station information according to the service request and the base station information, and finally, the processing unit 604 initiates bearer establishment for the service according to the target base station information, or, the target base station information is sent to the first multi-mode user equipment, such that the first multi-mode user equipment initiates bearer establishment for the service according to the target base station information. Since the centralized control entity in the solution may obtain the base station information of the respective base stations in the multi-RAT network in real time and select proper RAT base station information in accordance with service demand of the user equipment, so as to initiate bearer establishment for the service. Compared with the prior art which only aims at a particular service and handover can only be performed in particular RAT networks, the present solution does not has particular limitation on a service, and moreover, a proper RAT network may be selected from multiple RAT networks more flexibly for each service without increasing power consumption of the user equipment, thus having wider adaptability.

Embodiment 7

Correspondingly, an embodiment of the present invention further provides a user equipment, including a sending unit 701, a receiving unit 702 and a processing unit 703.

The sending unit 701 is configured to send a service request to a centralized control entity;

wherein the service request carries an identity of a first multi-mode user equipment, a service type and information about QoS required by a service.

Optionally, the service request may further carry information such as a base station set A1 where the first multi-mode user equipment has resided, selection of user experience (e.g., cheapest, fastest and/or the like) and/or the like, wherein the base station set A1 where the first multi-mode user equipment has resided may include information of each base station in the set A1, such as PLMN information, base station technology, base station identity and/or the like.

In addition, if the first multi-mode user equipment initiates a new service towards the second multi-mode user equipment, besides carrying the identity of the first multi-mode user equipment, the service type, the information about QoS required by the service and the base station set A1 where the first multi-mode user equipment has resided, the service request may also carry an identity of the second multi-mode user equipment, and certainly, the service request may optionally also carry other information such as selection of user experience and/or the like.

The receiving unit 702 is configured to receive target base station information sent by the centralized control entity according to the service request.

The processing unit 703 is configured to initiate bearer establishment for the service according to the target base station information.

The receiving unit 702 may be specifically configured to receive a target base station list sent by the centralized control entity according to the service request; and in this case, the processing unit 703 may be specifically configured to select a target base station from the target base station list, and initiate bearer establishment for the service according to the target base station.

Or, the receiving unit 702 may also be specifically configured to receive a target base station sent by the centralized control entity according to the service request; and in this case, the processing unit 703 may be specifically configured to initiate bearer establishment for the service according to the target base station.

The foregoing embodiments may be referred to for a method of determining the target base station or the target base station list, which will not be repeated redundantly herein.

A method of initiating bearer establishment for the service according to the target base station may be specifically as follows:

determining whether the user equipment has attached to a network to which the target base station belongs; if the user equipment has attached to the network, handing over to the target base station, and initiating bearer establishment for the service towards the target base station; and if the user equipment has not attached to the network, initiating bearer establishment for the service towards the target base station after being attached to the network to which the target base station belongs. Namely, the processing unit 703 may be specifically configured to determine whether the user equipment has attached to a network to which the target base station belongs; if the user equipment has attached to the network, hand over to the target base station, and initiate bearer establishment for the service towards the target base station; and if the user equipment has not attached to the network, initiate establishment of a service bearer towards the target base station after being attached to the network to which the target base station belongs.

The user equipment may be specifically a terminal device such as a mobile phone, a tablet computer or the like.

In a specific embodiment, the above-mentioned respective units may be implemented with independent entities, or be randomly combined to be implemented with a same or multiple entities. The foregoing method embodiments may be referred to for a specific implementation of the above-mentioned respective units, which will not be repeated redundantly herein.

As can be seen from the above, in the present embodiment, the sending unit 701 may send the centralized control entity the service request carrying the identity of the first multi-mode user equipment, the service type and the information about QoS required by the service, the receiving unit 702 receives the target base station information sent by the centralized control entity, and then the processing unit 703 initiates bearer establishment for the service according to the target base station information. Since the centralized control entity in the solution may obtain the base station information of the respective base stations in the multi-RAT network in real time and select proper RAT base station information in accordance with service demand of the user equipment, so as to initiate bearer establishment for the service. Compared with the prior art which only aims at a particular service and handover can only be performed in particular RAT networks, the present solution does not has particular limitation on a service, and moreover, a proper RAT network may be selected from multiple RAT networks more flexibly for each service without increasing power consumption of the user equipment, thus having wider adaptability.

Embodiment 8

An embodiment of the present invention further provides a communication system, including any network side device and any user equipment provided by the embodiments of the present invention. embodiment 6 may be referred to for the network side device, and embodiment 7 may be referred for the user equipment, which will not be repeated redundantly herein.

The communication system may also achieve a technical effect same as that of the network side device and the user equipment provided by the embodiments of the present invention, and will not be repeated redundantly herein.

Those of ordinary skill in the art may understand that all or a part of the steps in various methods in the above-mentioned embodiments may be implemented by a program instructing corresponding hardware, and the program may be stored in a computer readable storage medium. The storage medium may include a read only memory (ROM), a random access memory (RAM), a magnetic disk, an optical disk or the like.

The foregoing describes the method, the apparatus and the system for service establishment for a multi-m ode user equipment provided by the embodiments of the present invention, and the present disclosure illustrates the principle and the implementation manner of the present invention by way of specific examples. The above-mentioned embodiments are merely used for helping to understand the method of the present invention and core concept thereof. Meanwhile, those skilled in the art will make variations to the specific implementation manner and an application scope according to the concept of the present invention. In a word, the contents in the present description should not be understood as limitation to the present invention.

What is claimed is:

1. A method for service establishment for a multi-mode user equipment, comprising:
   receiving a service request sent by a first multi-mode user equipment, wherein the service request carries an identity of the first multi-mode user equipment, a service type and information about quality of service required by a service;
   obtaining base station information of respective base stations in a multi-radio access technology network, wherein the base station information comprises information on load of a base station and information on quality of service of a service that the base station can provide;
   determining target base station information according to the service request and the base station information; and
   performing one of: initiating bearer establishment for the service according to the target base station information, and sending the target base station information to the first multi-mode user equipment, such that the first multi-mode user equipment initiates bearer establishment for the service according to the target base station information;
   wherein the obtaining base station information of respective base stations in a multi-radio access technology network comprises:
   obtaining capability information, subscription data and position information of the first multi-mode user equipment according to the identity of the first multi-mode user equipment;
   obtaining network coverage information of the respective base stations in the multi-radio access technology network;
   determining, according to the capability information, the subscription data and the position information of the first multi-mode user equipment and the network coverage information, a base station set where the first multi-mode user equipment can reside; and
   obtaining base station information of respective respective base stations in the base station set where the first multi-mode user equipment can reside;
   wherein the service request further carries a base station set where the first multi-mode user equipment has resided, and the method further comprises:
   obtaining base station information of respective base stations in the base station set where the first multi-mode user equipment has resided;
   selecting, according to the service request and the base station information of the respective base stations in the base station set where the first multi-mode user equipment has resided, a target base station from the base station set where the first multi-mode user equipment has resided;
   if a target base station can be selected from the base station set where the first multi-mode user equipment has resided, initiating bearer establishment for the service towards the target base station; and
   if a target base station cannot be selected from the base station set where the first multi-mode user equipment has resided, performing the step of obtaining base station information of respective base stations in a multi-radio access technology network.

2. The method of claim 1, wherein the determining target base station information according to the service request and the base station information comprises:
   selecting, according to the service request and the base station information of the respective base stations in the base station set where the first multi-mode user equipment can reside, a target base station from a difference set of the base station set where the first multi-mode user equipment can reside and the base station set where the first multi-mode user equipment has resided; and
   wherein the initiating bearer establishment for the service according to the target base station information comprises: initiating bearer establishment for the service towards the target base station.

3. The method of claim 1, wherein the determining target base station information according to the service request and the base station information comprises:
   selecting, according to the service request and the base station information of the respective base stations in the base station set where the first multi-mode user equipment can reside, a plurality of target base stations from a difference set of the base station set where the first multi-mode user equipment can reside and the base station set where the first multi-mode user equipment has resided, so as to obtain a target base station list;

and wherein the sending the target base station information to the first multi-mode user equipment, such that the first multi-mode user equipment initiates bearer establishment for the service according to the first target base station information, comprises: sending the target base station list to the first multi-mode user equipment, such that the first multi-mode user equipment determines a target base station according to the target base station list and initiates bearer establishment for the service towards the target base station.

4. A method for service establishment for a multi-mode user equipment, comprising:

receiving a service request sent by a first multi-mode user equipment, wherein the service request carries an identity of the first multi-mode user equipment, a service type and information about quality of service required by a service;

obtaining base station information of respective base stations in a multi-radio access technology network, wherein the base station information comprises information on load of a base station and information on quality of service of a service that the base station can provide;

determining target base station information according to the service request and the base station information; and performing one of: initiating bearer establishment for the service according to the target base station information, and sending the target base station information to the first multi-mode user equipment, such that the first multi-mode user equipment initiates bearer establishment for the service according to the target base station information;

wherein the service request further carries a base station set where the first multi-mode user equipment has resided and an identity of a second multi-mode user equipment, and wherein after receiving the service request sent by the first multi-mode user equipment, the method further comprises:

paging the second multi-mode user equipment via the respective base stations in the multi-radio access technology network;

sending a residence information inquiry request to the second multi-mode user equipment, so as to obtain a base station set where the second multi-mode user equipment has resided;

obtaining base station information of respective base stations in the base station set where the first multi-mode user equipment has resided and base station information of respective base stations in the base station set where the second multi-mode user equipment has resided;

selecting, according to the service request and the base station information of the respective base stations in the base station set where the first multi-mode user equipment has resided, a first target base station from the base station set where the first multi-mode user equipment has resided;

selecting, according to the service request and the base station information of the respective base stations in the base station set where the second multi-mode user equipment has resided, a second target base station from the base station set where the second multi-mode user equipment has resided;

if a first target base station can be selected from the base station set where the first multi-mode user equipment has resided and a second target base station can be selected from the base station set where the second multi-mode user equipment has resided, initiating bearer establishment for the service towards the first target base station and the second target base station respectively; and performing the step of obtaining base station information of the respective base stations in a multi-radio access technology network if one of the following conditions is satisfied: a first target base station cannot be selected from the base station set where the first multi-mode user equipment has resided, and a second target base station cannot be selected from the base station set where the second multi-mode user equipment has resided.

5. The method of claim 4, wherein the obtaining base station information of respective base stations in a multi-radio access technology network comprises:

obtaining, according to the identity of the first multi-mode user equipment and the identity of the second multi-mode user equipment, capability information, subscription data and position information of the first multi-mode user equipment, and capability information, subscription data and position information of the second multi-mode user equipment, respectively;

obtaining network coverage information of the respective base stations in the multi-radio access technology network;

determining, according to the capability information, the subscription data and the position information of the first multi-mode user equipment and the network coverage information, a base station set where the first multi-mode user equipment can reside;

determining, according to the capability information, the subscription data and the position information of the second multi-mode user equipment and the network coverage information, a base station set where the second multi-mode user equipment can reside; and obtaining base station information of respective base stations in the base station set where the first multi-mode user equipment can reside, and obtaining base station information of respective base stations in the base station set where the second multi-mode user equipment can reside.

6. The method of claim 5, wherein the determining target base station information according to the service request and the base station information comprises:

selecting, according to the service request and the base station information of the respective base stations in the base station set where the first multi-mode user equipment can reside, a first target base station from a difference set of the base station set where the first multi-mode user equipment can reside and the base station set where the first multi-mode user equipment has resided; and selecting, according to the service request and the base station information of the respective base stations in the base station set where the second multi-mode user equipment can reside, a second target base station from a difference set of the base station set where the second multi-mode user equipment can reside and the base station set where the second multi-mode user equipment has resided;

and wherein the initiating bearer establishment for the service according to the target base station information comprises: initiating bearer establishment for the service towards the first target base station and the second target base station respectively.

7. A network side device, comprising:
a receiving unit, configured to receive a service request sent by a first multi-mode user equipment, wherein the service request carries an identity of the first multi-mode user equipment, a service type and information about quality of service required by a service;
an obtaining unit, configured to obtain base station information of respective base stations in a multi-radio access technology network, wherein the base station information comprises information on load of a base station and information on quality of service of a service that the base station can provide;
a determining unit, configured to determine target base station information according to the service request and the base station information; and
a processing unit, configured to perform one of: initiating bearer establishment for the service according to the target base station information, and sending the target base station information to the first multi-mode user equipment, such that the first multi-mode user equipment initiates bearer establishment for the service according to the target base station information;
wherein the obtaining unit is specifically configured to obtain capability information, subscription data and position information of the first multi-mode user equipment according to the identity of the first multi-mode user equipment obtain network coverage information of the respective base stations in the multi-radio access technology network; determine, according to the capability information, the subscription data and the position information of the first multi-mode user equipment and the network coverage information, a base station set where the first multi-mode user equipment can reside; and obtain base station information of respective respective base stations in the base station set where the first multi-mode user equipment can reside;
wherein the service request further carries a base station set where the first multi-mode user equipment has resided, and wherein
the obtaining unit is further configured to obtain base station information of respective base stations in the base station set where the first multi-mode user equipment has resided;
the determining unit is further configured to select, according to the service request and the base station information of the respective base stations in the base station set where the first multi-mode user equipment has resided, a target base station from the base station set where the first multi-mode user equipment has resided; and
the processing unit is further configured to, if a target base station can be selected from the base station set where the first multi-mode user equipment has resided, initiate bearer establishment for the service towards the target base station; and if a target base station cannot be selected from the base station set where the first multi-mode user equipment has resided, trigger the obtaining unit to perform the step of obtaining base station information of respective base stations in a multi-radio access technology network.

8. The network side device of claim 7, wherein
the determining unit is specifically configured to select, according to the service request and the base station information of the respective base stations in the base station set where the first multi-mode user equipment can reside, a target base station from a difference set of the base station set where the first multi-mode user equipment can reside and the base station set where the first multi-mode user equipment has resided; and
the processing unit is specifically configured to initiate bearer establishment for the service towards the target base station.

9. The network side device of claim 7, wherein
the determining unit is specifically configured to select, according to the service request and the base station information of the respective base stations in the base station set where the first multi-mode user equipment can reside, a plurality of target base stations from a difference set of the base station set where the first multi-mode user equipment can reside and the base station set where the first multi-mode user equipment has resided, so as to obtain a target base station list; and
the processing unit is specifically configured to send the target base station list to the first multi-mode user equipment, such that the first multi-mode user equipment determines a target base station according to the target base station list and initiates bearer establishment for the service towards the target base station.

10. A network side device, comprising:
a receiving unit, configured to receive a service request sent by a first multi-mode user equipment, wherein the service request carries an identity of the first multi-mode user equipment, a service type and information about quality of service required by a service;
an obtaining unit, configured to obtain base station information of respective base stations in a multi-radio access technology network, wherein the base station information comprises information on load of a base station and information on quality of service of a service that the base station can provide;
a determining unit, configured to determine target base station information according to the service request and the base station information; and
a processing unit, configured to perform one of: initiating bearer establishment for the service according to the target base station information, and sending the target base station information to the first multi-mode user equipment, such that the first multi-mode user equipment initiates bearer establishment for the service according to the target base station information;
wherein the obtaining unit is specifically configured to obtain capability information, subscription data and position information of the first multi-mode user equipment according to the identity of the first multi-mode user equipment obtain network coverage information of the respective base stations in the multi-radio access technology network; determine, according to the capability information, the subscription data and the position information of the first multi-mode user equipment and the network coverage information, a base station set where the first multi-mode user equipment can reside; and obtain base station information of respective respective base stations in the base station set where the first multi-mode user equipment can reside;
wherein the service request further carries a base station set where the first multi-mode user equipment has resided and an identity of a second multi-mode user equipment, the network side device further comprises a paging unit and an inquiry unit;

the paging unit is configured to page the second multi-mode user equipment via the respective base stations in the multi-radio access technology network;

the inquiry unit is configured to a residence information inquiry request to the second multi-mode user equipment, so as to obtain a base station set where the second multi-mode user equipment has resided;

the obtaining unit is further configured to obtain base station information of respective base stations in the base station set where the first multi-mode user equipment has resided and base station information of respective base stations in the base station set where the second multi-mode user equipment has resided;

the determining unit is further configured to select, according to the service request and the base station information of the respective base stations in the base station set where the first multi-mode user equipment has resided, a first target base station from the base station set where the first multi-mode user equipment has resided, and select, according to the service request and the base station information of the respective base stations in the base station set where the second multi-mode user equipment has resided, a second target base station from the base station set where the second multi-mode user equipment has resided; and the processing unit is further configured to, if a first target base station can be selected from the base station set where the first multi-mode user equipment has resided and a second target base station can be selected from the base station set where the second multi-mode user equipment has resided, initiate bearer establishment for the service towards the first target base station and the second target base station respectively; and trigger the obtaining unit to perform the step of obtaining base station information of the respective base stations in a multi-radio access technology network if one of the following conditions is satisfied: a first target base station cannot be selected from the base station set where the first multi-mode user equipment has resided, and a second target base station cannot be selected from the base station set where the second multi-mode user equipment has resided.

11. The network side device of claim 10, wherein
the obtaining unit is specifically configured to obtain, according to the identity of the first multi-mode user equipment and the identity of the second multi-mode user equipment, capability information, subscription data and position information of the first multi-mode user equipment, and capability information, subscription data and position information of the second multi-mode user equipment, respectively; obtain network coverage information of the respective base stations in the multi-radio access technology network; determine, according to the capability information, the subscription data and the position information of the first multi-mode user equipment and the network coverage information, a base station set where the first multi-mode user equipment can reside; determine, according to the capability information, the subscription data and the position information of the second multi-mode user equipment and the network coverage information, a base station set where the second multi-mode user equipment can reside; and obtain base station information of respective base stations in the base station set where the first multi-mode user equipment can reside, and obtain base station information of respective base stations in the base station set where the second multi-mode user equipment can reside.

12. The network side device of claim 11, wherein
the determining unit is specifically configured to select, according to the service request and the base station information of the respective base stations in the base station set where the first multi-mode user equipment can reside, a first target base station from a difference set of the base station set where the first multi-mode user equipment can reside and the base station set where the first multi-mode user equipment has resided; and select, according to the service request and the base station information of the respective base stations in the base station set where the second multi-mode user equipment can reside, a second target base station from a difference set of the base station set where the second multi-mode user equipment can reside and the base station set where the second multi-mode user equipment has resided; and the processing unit is specifically configured to initiate bearer establishment for the service towards the first target base station and the second target base station respectively.

* * * * *